US011853537B2

(12) United States Patent
Child et al.

(10) Patent No.: US 11,853,537 B2
(45) Date of Patent: Dec. 26, 2023

(54) PROVIDING A SEQUENCE-BUILDER-USER INTERFACE FOR GENERATING A DIGITAL ACTION SEQUENCE

(71) Applicant: Qualtrics, LLC, Provo, UT (US)

(72) Inventors: Evan Paul Child, Provo, UT (US); Vernon W Hui, Bellevue, WA (US); Joseph Scott Reese, Heber City, UT (US)

(73) Assignee: Qualtrics, LLC, Provo, UT (US)

( * ) Notice: Subject to any disclaimer, the term of this patent is extended or adjusted under 35 U.S.C. 154(b) by 53 days.

(21) Appl. No.: 17/493,619

(22) Filed: Oct. 4, 2021

(65) Prior Publication Data

US 2023/0121261 A1 Apr. 20, 2023

(51) Int. Cl.
 G06F 3/04842 (2022.01)
 H04L 67/02 (2022.01)
 G06F 9/54 (2006.01)
(52) U.S. Cl.
 CPC ......... *G06F 3/04842* (2013.01); *G06F 9/542* (2013.01); *G06F 9/547* (2013.01); *H04L 67/02* (2013.01)
(58) Field of Classification Search
 CPC .................................................. G06F 3/04842
 See application file for complete search history.

(56) References Cited

U.S. PATENT DOCUMENTS

| 2015/0248226 | A1* | 9/2015 | Kumar | H04L 67/02 715/747 |
| 2020/0225839 | A1* | 7/2020 | Marin | G06F 9/451 |
| 2021/0392053 | A1* | 12/2021 | Singh | H04L 67/141 |

OTHER PUBLICATIONS

ServiceNow: Wherever the office goes, make work flow; Date downloaded Oct. 19, 2021; https://www.servicenow.com.

* cited by examiner

*Primary Examiner* — Roland J Casillas
(74) *Attorney, Agent, or Firm* — Keller Preece PLLC

(57) ABSTRACT

The present disclosure relates to systems, non-transitory computer-readable media, and methods that provide a graphical user interface for intuitively generating digital action sequences across one or more digital platforms. For example, the disclosed systems generate graphical user interfaces with tools to construct digital action sequences of platform actions performed based on event triggers. To facilitate building such digital action sequences, in some cases, the disclosed systems provide data for digital-action-sequence templates for easy selection of pre-matched event triggers and platform actions or tools to mix-and-match combinations of specific event triggers and platform actions. By providing such intuitive tools in a centralized graphical user interface, the disclosed systems can connect events across multiple platforms or across disconnected components of a single platform. Indeed, in certain implementations, the disclosed systems provide a low-code/no-code graphical user interface for selection of a multitude of different digital action sequences and in myriad different configurations.

20 Claims, 20 Drawing Sheets

Create a New Ticket

- Priority: Low
- Ticket Name: Untitled Ticket
- Ticket Group: Choose Group
- Owner: Person 1 (p1@email.com)
- Ticket Summary
- Score
- Comments
- Ticket Data
- Follow up Data
- Root Cause Cancel | Save

*Fig. 3K*

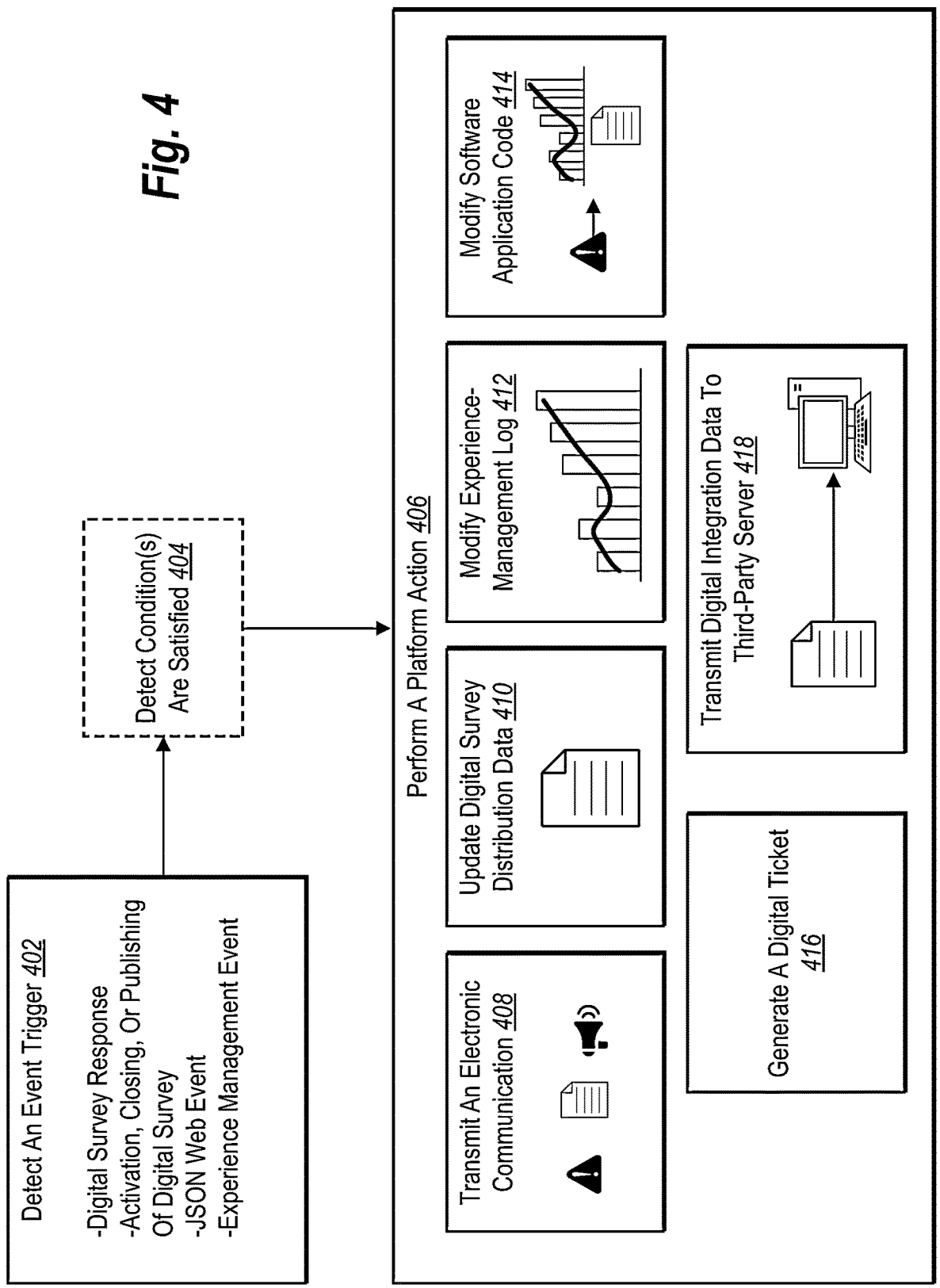

PROVIDING A SEQUENCE-BUILDER-USER INTERFACE FOR GENERATING A DIGITAL ACTION SEQUENCE

BACKGROUND

In recent years, conventional systems have improved the variety and artificial intelligence of algorithms that track and perform digital actions. These conventional systems may include experience management systems, digital survey distribution systems, software code modification systems, and/or other systems that implement digital processes. For example, several digital systems have independently developed and implemented computing models to track digital actions across web browsers, mobile applications, and other software applications according to user permissions or opt-ins. For instance, conventional systems may track desktops or mobile computing devices using a web browser to respond to digital surveys, transmit electronic communications, or synthesize user segments based on user inputs. Independent from such tracking, several conventional systems have developed and implemented computing models to perform various digital actions using servers.

While conventional systems have increasingly attempted to draw data from other independently operated computing systems, many such systems still work independently or rely on customized application programming interface (API) calls. Consequently, the independently developed tracking and digital action models of conventional systems have fomented a variety of disconnected platforms that computing systems often must operate independently without sharing data. Within such a tangle of disconnected platforms, conventional systems exhibit a number of technical shortcomings. To illustrate, conventional systems isolate applications into separate computing systems, inefficiently execute rigid algorithms that limit digital actions to pre-scheduled intervals or times, and utilize separate or navigation-intensive user interfaces.

As an example of disconnected platforms, conventional systems often implement plugins and other software components that operate exclusively with a single platform. In such cases, conventional systems may employ customized software components that solely recognize data conforming to a data model associated with a single platform. Accordingly, many conventional systems fail to recognize data from different platforms organized in a different data model or software language. In addition to customized programming languages, conventional systems may implement software components that are incompatible across multiple platforms. To bridge communication barriers between conventional systems and other isolated computing systems, some conventional analytics systems rely on corresponding and customized API calls, as noted above. Consequently, conventional systems often cannot integrate other isolated computing systems without rigid, custom-designed API pipelines for each individual isolated computing system.

Due to the rigid API-pipeline structure just described, some conventional systems also waste computing resources and operate with slow and inefficient inter-system computing protocols. For example, due to separate API calls, conventional systems may implement data requests that lead to inefficient, delayed reactions to changes across multiple computing systems. To illustrate, in some cases, conventional systems periodically request individual updates from other computing systems by using scheduled data requests. Because scheduled data requests occur at predetermined times, conventional systems often identify changes in other computing systems (or transmit such changes) at a delayed time rather than when those changes occur in real time. Such data requests can accordingly create inefficient cross-system changes and actions.

In part due to the disconnected and inefficient structure of existing analytics systems, conventional systems have historically proliferated independent (and sometimes duplicative) graphical user interfaces that require excessive cross-interface navigation and inputs. Specifically, some conventional systems implement a different, independent graphical user interface for each integrated computing system, thereby leading to an inordinate number of inputs and interactions with disparate graphical user interfaces by a client device. For example, to build a digital workflow, conventional systems may require a client device to navigate, select, and/or apply feature(s) in a user interface for a first platform, switch to a different user interface for a second platform, and then navigate, select, and/or apply additional feature(s) in the different user interface.

BRIEF SUMMARY

This disclosure describes embodiments of systems, non-transitory computer-readable media, and methods that solve one or more of the foregoing problems in the art or provide other benefits described herein. In particular, the disclosed systems provide a graphical user interface for intuitively generating digital action sequences (e.g., workflows) across one or more digital platforms. For example, the disclosed systems can generate graphical user interfaces with tools to construct digital action sequences of various platform actions (e.g., digital tasks) performed based on various event triggers. To facilitate building such digital action sequences, in some cases, the disclosed systems provide data for digital-action-sequence templates for easy selection of pre-matched event triggers and platform actions or tools to mix-and-match combinations of specific event triggers and platform actions. By providing such intuitive tools in a centralized graphical user interface, the disclosed systems can connect events across multiple platforms or across disconnected components of a single platform, including a variety of internal or external platforms relating to experience management systems, digital survey distribution systems, communication platforms, user segmentation systems, or alert-response systems. Indeed, in certain implementations, the disclosed systems can provide a low-code/no-code graphical user interface for selection of a multitude of different digital action sequences and in myriad different configurations.

This disclosure outlines additional features and advantages of one or more embodiments of the present disclosure in the following description.

BRIEF DESCRIPTION OF THE DRAWINGS

The detailed description provides one or more embodiments with additional specificity and detail through the use of the accompanying drawings, as briefly described below.

FIG. 4 illustrates an action sequence system performing a platform action based on an event trigger as part of a digital action sequence in accordance with one or more embodiments.

DETAILED DESCRIPTION

Figure 1:
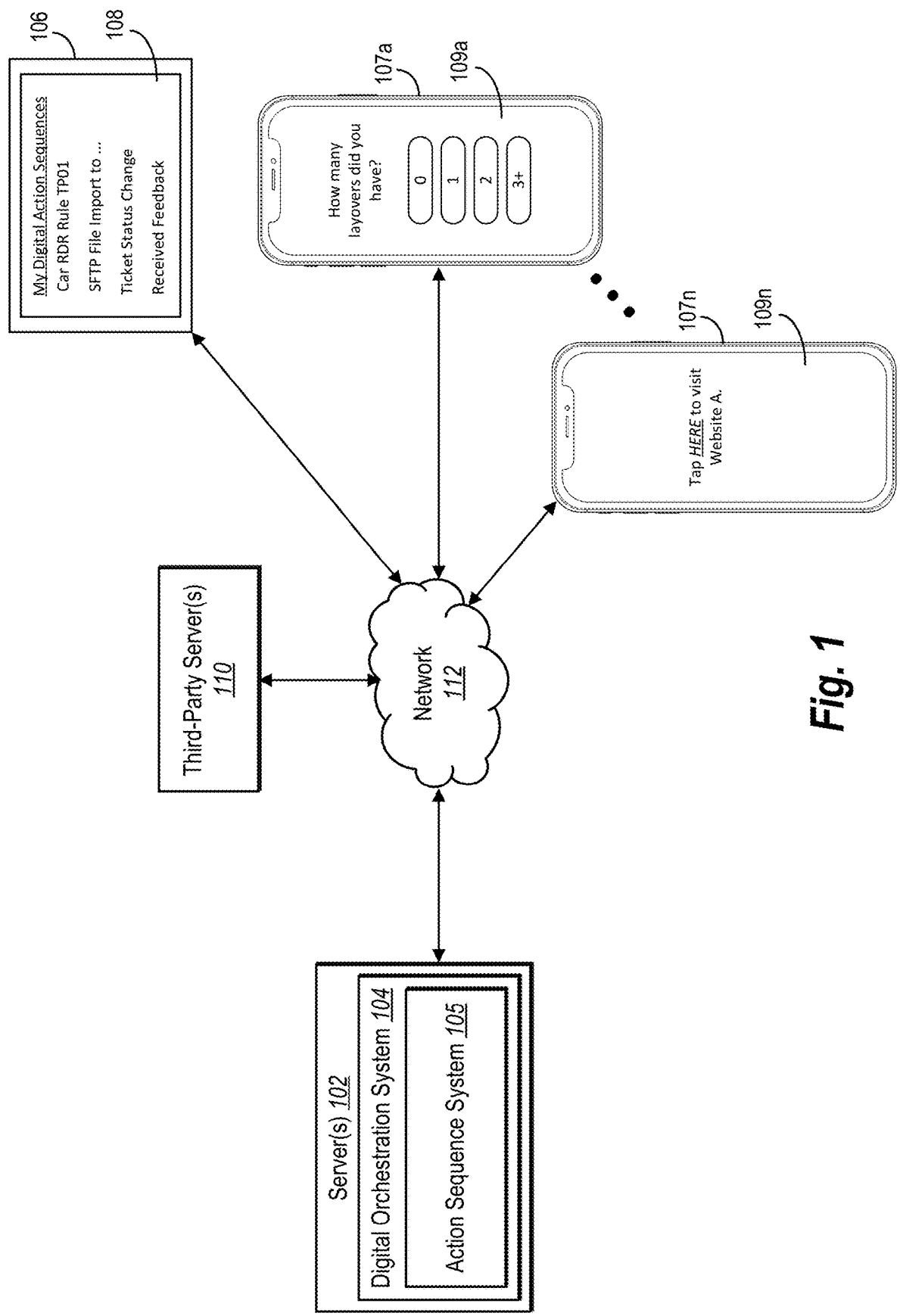
FIG. 1 illustrates a computing system environment for implementing an action sequence system in accordance with one or more embodiments.

This disclosure describes one or more embodiments of an action sequence system that provides a sequence-builder-user interface for generating customized digital action sequences across multiple different software platforms. For example, by providing data for and surfacing the sequence-builder-user interface, the action sequence system generates tools for users to select from one or more event triggers representing detected events or scheduled events. In addition to facilitating selection of an event trigger, the action sequence system can provide the sequence-builder-user interface with options for one or more platform actions (e.g., digital tasks) to perform in response to detecting the selected event trigger. In addition to generating a digital action sequence (e.g., digital workflow), in some embodiments, the action sequence system provides the sequence-builder-user interface with selectable conditions that, if selected, set conditions on performing the one or more platform actions. As indicated above, in certain implementations, the sequence-builder-user interface (e.g., as a low-code interface) includes selectable options or other graphical tools that facilitate configuring the one or more platform actions, event triggers, and conditions composing a digital action sequence in a highly customizable manner (e.g., in a block code paradigm) for simple-to-create, yet powerful digital action sequences.

In one or more embodiments, the action sequence system monitors event triggers or generates or implements digital action sequences (e.g., digital workflows) in the context of a platform for experience management of user interactions with an organization. For example, the action sequence system can detect or receive (as an event trigger) a survey response that is submitted by a user device through an application or a web site monitored or tracked by a platform for experience management for a particular organization (e.g., third-party application or organization's website). Moreover, the action sequence system can detect or receive data (as an event trigger) representing a user interaction (e.g., a view, a selection) of a user device within an application or website monitored or tracked by a platform for experience management for a particular organization. In some cases, the detected or received data can also represent interactions of users within an organization (e.g., employee interactions with the organization, employee interactions with other employees, employee interactions with users of an organizational website and/or application). In response, the action sequence system can implement a platform action, such as updating an experience management directory. In the paragraphs below, this disclosure further describes certain embodiments of the action sequence system implemented with or within a platform for experience management.

As noted above, in some embodiments, the action sequence system provides a sequence-builder-user interface for generating a digital action sequence. In one or more embodiments, by providing the sequence-builder-user interface, the action sequence system connects a variety of different software platforms via the action sequence system. For example, the action sequence system presents an application framework for internal and external developers to create new platform actions, event triggers, and conditions that seamlessly integrate cross-platform events and actions. Once created, the action sequence system catalogues and, in some instances, suggests the platform actions, the event triggers, and the conditions for user selection within the sequence-builder-user interface.

To illustrate, in one or more embodiments, the action sequence system provides a set of event triggers for user selection. Each event trigger of the set of event triggers can correspond to a respective event that, when detected, causes the action sequence system to initiate one or more platform actions (e.g., digital tasks). Additionally, an event trigger can correspond to an event occurring within external platforms or internal platforms. Examples of event triggers can include a digital survey response; an activation, closing, or digital publishing of a digital survey; a digital ticket event; a webhook event (e.g., a Java Script Object Notation (JSON) web event); an experience-management event; a creation of a digital content item; a digital event from an external platform; or a user opt-out selection. Additional examples of event triggers are described below.

In addition to options for platform actions, in some embodiments, the action sequence system provides a selectable option to indicate one or more conditions for performing a platform action upon detecting a selected event trigger. In particular embodiments, a condition outlines certain parameters or criteria that the action sequence system determines as satisfied before performing a platform action. For example, a condition may include a Boolean-detection rule for at least one of a question-type parameter, a quota-type parameter, or a status-type parameter. To illustrate, based on determining a question-type parameter is satisfied as a condition, the action sequence system can provide custom text interfaces for indicating a query and one or more corresponding responses. Therefore, in this example, the action sequence system only performs a platform action if the action sequence system detects a digital survey response comprising one or more indicated responses to the indicated query according to the question-type parameters of the condition.

In addition to options for event triggers and/or selectable conditions, the action sequence system provides a set of platform actions within the sequence-builder-user interface to continue building a digital action sequence (e.g., a digital workflow) based on user selections. In particular, the action sequence system provides selectable options for the set of platform actions to be performed based on detecting a prior-selected event trigger and optional condition. Examples of platform actions can include transmitting an electronic communication, generating a digital ticket, updating digital survey distribution data, adding data identifying or describing the event trigger to an experience-management log for an organization, adding or inserting code into a software application, or transmitting digital integration data to a third-party server via an application programming interface. Additional examples of platform actions are described below.

In one or more embodiments, the action sequence system includes options or tools within a sequence-builder-user interface to customize selection and implementation of the set of platform actions. For example, in certain implementations, the action sequence system identifies multiple user selections corresponding to multiple platform actions (e.g., aggregated platform actions) that can be performed upon detection of one or more event triggers. As another example, the action sequence system provides a selectable option to embed or nest one or more additional platform actions within a platform action. In yet another example, the action sequence system provides the set of platform actions available for performing within an external platform, an internal platform, or both, as may be desired.

In some embodiments, the action sequence system suggests or recommends one or more combinations of event triggers and platform actions in digital-action-sequence templates. For example, the action sequence system may surface within the sequence-builder-user interface a specific subset of event triggers, conditions, platform actions, or a combination of the foregoing based on the client device and/or associated user. To illustrate, the action sequence system may utilize a machine-learning model that processes various template parameters or factors to generate recommended digital-action-sequence templates that are specific to a user or user account corresponding to certain characteristics. Example template parameters can include a user-account-type identifier, a department-type identifier, digital user activity, metadata corresponding to the event trigger or the platform action, a feature or service of a digital orchestration platform selected by a user account within a threshold time period, or a type of a digital survey selected or distributed by the user account.

After identifying the event trigger(s), the platform action(s), and optionally the condition(s) as described above, the action sequence system can generate a digital action sequence to be saved for execution upon detection of the event trigger(s). Subsequently, upon identifying the event trigger(s), the action sequence system can proceed to perform the platform action(s) as part of the digital action sequence. Additionally, in some embodiments, the action sequence system provides the digital action sequence for display among a set of active digital action sequences for user reference or modification.

As discussed above, conventional systems demonstrate a number of technical problems and shortcomings. As described below, the disclosed action sequence system can improve the efficiency and speed of experience management, digital survey distribution, software code modification, digital ticket generation, analytics, third-party server data integration, orchestrated processes, and other computing systems over disconnected conventional systems and improve navigation among graphical user interfaces of conventional systems. For example, in some embodiments, the action sequence system integrates and links isolated computing platforms through a sequence-builder-user interface to generate digital action sequences that efficiently relate actions conventional systems rigidly kept separate. Unlike conventional systems that implement incompatible and isolated software components or rigid API-pipelines, the action sequence system can provide a sequence-builder-user interface to flexibly provide an array of event triggers and platform actions for user selections that connect events across multiple platforms (e.g., using different software languages) or within a platform. Based on such user selections through an improved graphical user interface, the action sequence system can generate a digital action sequence that, when executed, implements the selected connections from the sequence-builder-user interface. To illustrate an example scenario, the action sequence system can identify a user selection of an event trigger associated with a first platform (e.g., a survey distribution platform) and identify additional user selections for performing a platform action associated with a second platform (e.g., a ticket response platform) in response to the event trigger. Regardless of the event trigger and the platform action, the action sequence system can dynamically link cross-platform (or intra-platform) events and actions in a flexible, user-configurable manner via a single, centralized user interface—namely the sequence-builder-user interface.

Due at least in part to the increased system flexibility, the action sequence system can also improve the speed and reaction time of events in separate platforms or disconnected components of a single platform. For example, unlike conventional systems that implement separate API calls and other standalone data requests, the action sequence system more efficiently uses computing resources by avoiding the slowdown of periodic and rigid updates typical of conventional systems. Specifically, the action sequence system provides a sequence-builder-user interface for users to indicate user selections of an event trigger from a set of event triggers and a platform action from a set of platform actions. By implementing this centralized, user-interface approach, the action sequence system avoids the computing delays of periodic API calls or updates. Instead of such delayed action, the action sequence system performs one or more platform actions in real time (or near-real time) upon detecting an event trigger identified via the sequence-builder-user interface. Thus, the action sequence system can avoid the inefficient, delayed reactions to changes across multiple computing systems.

In addition to improved efficiency and speed, the action sequence system provides a graphical user interface that performs functions that conventional systems cannot perform and avoids cross-application navigation by introducing tools to generate a digital action sequence in a centralized graphical user interface. For example, the action sequence system provides, for display within a sequence-builder-user interface, a set of event triggers and a set of platform actions that correspond to multiple different platforms. To illustrate, the action sequence system can generate a digital action sequence previously absent from conventional systems—namely a digital action sequence that connects different platforms or disconnected components of a single platform. To illustrate, the digital action sequence can mix-and-match or provide a template linking event trigger(s) and/or platform action(s) across multiple platforms, such as survey responses via a survey distribution platform that trigger messaging users about the survey responses via a messaging platform. In some cases, the action sequence system provides options in the sequence-builder-user interface to include conditions (e.g., survey response questions/answers, survey status) for performing platform actions as part of a digital action sequence. Rather than force users to open, scroll, input, and switch between separate graphical user interfaces, the sequence-builder-user interface consolidates graphical options into a centralized graphical user interface and removes the need to navigate between (and use) multiple interfaces for different analytics systems.

As illustrated by the foregoing discussion, the present disclosure utilizes a variety of terms to describe features and benefits of the action sequence system. For example, as used herein, the term "digital action sequence" refers to a defined sequence or digital workflow of one or more platform actions that are performed based on one or more event triggers. In particular embodiments, a digital action sequence includes (i) at least one event trigger selected by a user via a graphical user interface to be a basis for (or trigger to) (ii) at least one platform action selected by the user via a graphical user interface and automatically performed in response to detection of at least one event trigger. For example, a digital action sequence can include a digital workflow of detecting an event trigger based on a digital survey response and, in response, performing a platform action comprising building a segment of users and/or generating graphic visualizations. Optionally, in certain implementations, a digital action sequence includes one or more conditions that are requisite to performing a platform action.

As also used herein, the term "platform action" refers to a digital act, modification, process, task, or operation in relation to data corresponding to a particular platform. In particular, a platform action can include a variety of actions, digital tasks, modifications, processes, or operations that modify, create, transmit, display, or store a data object (e.g., a domain object) that includes particular rules, data, and/or functions within a computing system. For example, a platform action can include transmitting an electronic communication, generating a digital ticket, updating digital survey distribution data, adding data identifying or describing an event trigger to an experience-management log for an organization, adding or inserting code into a software application, or transmitting digital integration data to a third-party server via an application programming interface. In certain implementations, a platform action includes one or more bulk actions (e.g., large batches of actions performed over and over). For instance, a platform action can include myriad different digital tasks for multi-record file ingestion.

Relatedly, the term "platform" refers to a technological environment for which software components and applications are developed and within which computing devices operate software components and applications. For example, a platform may include server devices that execute a specific software language or machine language code and also run a type of software or suite of compatible software applications. A platform may likewise use a data model that is specific to the platform and that specifies data formats for storing, sending, and receiving data. Accordingly, one platform's data model may differ from and be incompatible with another platform's data model.

Similarly, the term "digital orchestration platform" refers to a technological environment in which software components and applications operate to analyze and determine conclusions concerning data. For example, a digital orchestration platform can include software components and applications to generate, analyze, and present conclusions or summaries of digital surveys. The digital orchestration platform can also include software components and applications to receive, analyze, and/or communicate various components of digital surveys (e.g., survey responses, digital survey reports, digital survey links) via electronic communication components, machine learning components, digital survey management components. In some cases, the digital orchestration platform can include a software component and/or application that performs a specific function (e.g., analyzing digital surveys) within an overarching computing system (e.g., the digital orchestration system) that receives, analyzes, and/or communicates various components of digital surveys.

Additionally, as used herein, the term "event trigger" refers to one or more digital events representing a result, action, status, or fact with respect to a digital object in a digital platform. Upon selection of an event trigger for inclusion within a digital action sequence, the action sequence system performs (or causes another system to perform) a platform action in the form of a subsequent event or multiple subsequent events. In particular embodiments, an event trigger can include (or define) configurable components—namely the software platform or service initiating an event, the data object or entity of interest within a domain of the software platform, and the actual event itself. For example, the event trigger may define the software platform initiating the event, such as a digital sales platform (e.g., a Salesforce® platform), a ticket response platform (e.g., a Zendesk® platform), or a survey management platform or experience management platform (e.g., a Qualifies® platform). Additionally, for example, the event trigger may define the data object or entity of interest within the domain of the software platform, such as a digital ticket, a digital survey, a lead identifier, a user account. Likewise, the event trigger may define the actual event itself, such as the data object or entity being closed, created, published, updated, shared, contacted, logged in, displayed. Some examples of an event trigger include detecting a digital survey response; an activation, closing, or digital publishing of a digital survey; a digital ticket event; a Java Script Object Notation (JSON) web event; an experience-management event; a creation of a digital content item; a digital event from an external platform; or a user opt-out selection. Alternatively, for scheduled platform actions, an event trigger can include a certain amount of time lapsing after a particular timestamp or after another event trigger. Similarly, an event trigger can include a certain timestamp or date being detected (e.g., for scheduled platform actions).

As also used herein, the term "condition" refers to one or more digital criteria requisite to performing a platform action. In particular embodiments, a condition can include parameters or rules that, if detected, satisfy a necessary qualification for an implementing computing device to perform a platform action upon identifying an event trigger. A condition may indicate or require certain attributes of an event trigger. Additionally or alternatively, a condition may indicate or require attributes of other actions, digital inputs, device states of implementing computing devices, etc. For example, a condition may include a Boolean-detection rule (e.g., a categorical-based rule) indicating at least one of a question-type parameter, an embedded-data-type parameter (e.g., relating to previous platform actions), a quota-type parameter, or a status-type parameter.

Additionally, as used herein, the term "sequence-builder-user interface" refers to a graphical user interface for adjusting, configuring, generating, or managing a digital action sequence. For example, a computing device receives user inputs from a user through a sequence-builder-user interface, such as a click/tap to view, interact with, or generate a digital action sequence. Additionally, in one or more embodiments, the sequence-builder-user interface presents a variety of types of information, including text, graphical presentations of event triggers, conditions, platform actions, digital-action-sequence templates, or other information related to digital action sequences.

As used herein, a "machine learning model" refers to a computer representation that can be tuned (e.g., trained) based on inputs to approximate unknown functions. For instance, a machine-learning model can include, but is not limited to, a differentiable function approximator, a neural network (e.g., a convolutional neural network or deep learning model), a decision tree (e.g., a gradient boosted decision tree), a linear regression model, a logistic regression model, a clustering model, association rule learning, inductive logic programming, support vector learning, Bayesian network, regression-based model, principal component analysis, or a combination thereof.

In some embodiments, a machine-learning model generates a digital-action-sequence template. As referred to herein, the term "digital-action-sequence template" refers to a sample or predicted digital action sequence pre-generated for a user, user device, or user account to select. In particular embodiments, a digital-action-sequence template can include a pre-generated combination of at least one event trigger and at least one platform action available for user selection via a sequence-builder-user interface (e.g., a graphical user interface) by a specific user, user device, or user account. For example, a digital-action-sequence template can include a pre-generated digital action sequence based on one or more preconfigured or adjustable default settings (e.g., pre-generated digital action sequences for administrators).

Relatedly, the term "template parameters" refers to one or more data inputs for generating a digital-action-sequence template. In particular embodiments, a template parameter refers to user-generated parameters or system-detected parameters that are analyzed or processed by a machine-learning model trained to predict digital-action-sequence templates. Examples of template parameters can include a user-account-type identifier, a department-type identifier, digital user activity, metadata corresponding to the event trigger or the platform action, a feature or service of a digital orchestration platform selected by a user account within a threshold time period, or a type of a digital survey selected or distributed by the user account.

As used herein, the term "digital survey" refers to an electronic communication that collects information concerning one or more respondents by capturing information from (or posing questions to) such respondents. For instance, digital surveys include electronic communications that prompt or request survey responses (e.g., answers, digital information, feedback, statements, opinions, problems, ratings) via one or more digital channels such as SMS message, instant message, e-mail, social media posts, etc. Examples of digital surveys can include questionnaires, digital polls, requests for ratings, market research surveys, employee satisfaction surveys, job satisfaction surveys, customer satisfaction surveys, exit interview forms, brand awareness surveys, product surveys, evaluation surveys, etc.

Additional detail will now be provided in relation to illustrative figures portraying example embodiments and implementations of the persona group system. For example, FIG. 1 illustrates a computing system environment (or "environment") 100 for implementing an action sequence system 105 in accordance with one or more embodiments. As shown in FIG. 1, the environment 100 includes server(s) 102, administrator client device 106, client devices 107a-107n, third-party server(s) 110, and a network 112.

As depicted in FIG. 1, the server(s) 102, the administrator client device 106, the client devices 107a-107n, and the third-party server(s) 110 are communicatively coupled with each other either directly or indirectly through the network 112 (as discussed in greater detail below in relation to FIG. 6). Additionally, in some embodiments, the server(s) 102, the administrator client device 106, the client devices 107a-107n, and the third-party server(s) 110 include a variety of computing devices (including one or more computing devices as discussed in greater detail with relation to FIG. 6).

As mentioned above, the environment 100 includes the server(s) 102. In one or more embodiments, the server(s) 102 generate, store, receive, and/or transmit digital data, including digital data related to digital action sequences. For example, in certain implementations, the server(s) 102 receive, in response to a digital survey, survey responses from the client devices 107a-107n. Further, in some embodiments, the server(s) 102 receive user input from the administrator client device 106 selecting an event trigger, a platform action, and (optionally) a condition for generating a digital action sequence. In one or more embodiments, the server(s) 102 comprise a data server. The server(s) 102 can also comprise a communication server or a web-hosting server.

As additionally shown in FIG. 1, the server(s) 102 includes a digital orchestration system 104. The digital orchestration system 104 collects, manages, and/or utilizes analytics data. For example, the digital orchestration system 104 collects analytics data related to digital actions executed by the client devices 107a-107n. The digital orchestration system 104 collects the analytics data in a variety of ways. For example, in one or more embodiments, the digital orchestration system 104 causes the server(s) 102 to track digital actions performed by users via the client devices 107a-107n and report the digital actions for storage (e.g., in the form of a digital action log) on a database. In some embodiments, the third-party server(s) 110 tracks the digital actions and stores them within an analytics database. Accordingly, in certain embodiments, the digital orchestration system 104 retrieves the digital actions tracked by the third-party server(s) 110 from the analytics database such that the action sequence system 105 can identify one or more event triggers.

As depicted in FIG. 1, the server(s) 102 include the action sequence system 105. In certain implementations, the action sequence system 105 performs the actions, functions, and features described by this disclosure. In particular, in one or more embodiments, the action sequence system 105 provides, for display within a sequence-builder-user interface, an action-sequence-creation option for generating a digital action sequence. For example, the action sequence system 105 provides, for display within the sequence-builder-user interface, a set of event triggers and a set of platform actions based on identifying a user selection of the action-sequence-creation option. Subsequently, in one or more embodiments, the action sequence system 105 identifies user selections of an event trigger from the set of event triggers and a platform action from the set of platform actions. Based on identifying the user selections of the event trigger and the platform action, the action sequence system 105 executes the digital action sequence that performs the platform action upon detecting the event trigger.

As shown in FIG. 1, the environment 100 includes the administrator client device 106 and the client devices 107a-107n. In certain embodiments, the administrator client device 106 and the client devices 107a-107n can include smartphones, tablets, desktop computers, laptop computers, head-mounted-display devices, smart watches, or other electronic devices.

In some embodiments, the administrator client device 106 includes an administrator client application 108 that can access and display digital data related to one or more users (e.g., digital survey responses) or selectable options for creating, modifying, and/or managing a digital action sequence. Similarly, for instance, the client devices 107a-

107*n* include client applications 109*a*-109*n* that allow users to provide user input, such as for interacting with digital surveys and providing survey responses, opting-out of electronic communications, or navigating a webpage. In particular embodiments, the administrator client application 108 and/or the client applications 109*a*-109*n* include software applications respectively installed on the implementing devices. Additionally, or alternatively, the administrator client application 108 and/or the client applications 109*a*-109*n* can include a web browser or other application that accesses a software application hosted on the server(s) 102.

In one or more embodiments, the third-party server(s) 110 correspond to customer servers, client servers, or servers for other entities. For instance, the third-party server(s) 110 can include an organization server that corresponds to the client devices 107*a*-107*n*. Accordingly, in some embodiments, the third-party server(s) 110 receive digital surveys from the server(s) 102 to distribute to one or more client devices for the organization.

In some embodiments, the third-party server(s) 110 host a storage database for storing digital content (e.g., survey responses, machine-learning models). Additionally or alternatively, the third-party server(s) 110 comprise a digital content distribution server for distributing digital content or tracking, detecting, storing, or otherwise identifying other digital data (e.g., clickstream data) provided by users via client devices.

The action sequence system 105 can be implemented in whole, or in part, by the individual elements of the environment 100. Indeed, although FIG. 1 illustrates the action sequence system 105 implemented with regard to the server(s) 102, different components of the action sequence system 105 can be implemented by a variety of devices within the environment 100. For example, one or more (or all) components of the action sequence system 105 can be implemented by a different computing device (e.g., one or more of the client devices 107*a*-107*n* or the administrator client device 106) or a separate server from the server(s) 102 (e.g., the third-party server(s) 110).

Although the environment 100 of FIG. 1 is depicted as having a particular number of components, the environment 100 can have any number of additional or alternative components (e.g., any number of servers, administrator devices, client devices, databases, third-party servers, or other components in communication with the action sequence system 105 via the network 112). For example, although not shown, the environment 100 may include one or more analytics databases storing survey response data, anonymized (e.g., scrubbed) data, etc. Similarly, various additional or alternative arrangements are possible.

As mentioned above, the action sequence system 105 provides one or more of the event triggers, the conditions, and/or the platform actions for user selection via a sequence-builder-user interface. In certain instances, the action sequence system 105 provides the event triggers, the conditions, and/or the platform actions as part of digital-action-sequence templates that are specific to an administrator client device (e.g., utilizing a machine-learning model approach). Subsequently, the action sequence system 105 can generate a digital action sequence based on user selections of one or more event triggers, conditions, and/or platform actions. For example, the action sequence system 105 can identify indications of user input at an administrator client device to generate and activate a digital action sequence based on indicated user selections of an event trigger, a platform action, and (optionally) a condition.

Figure 2:
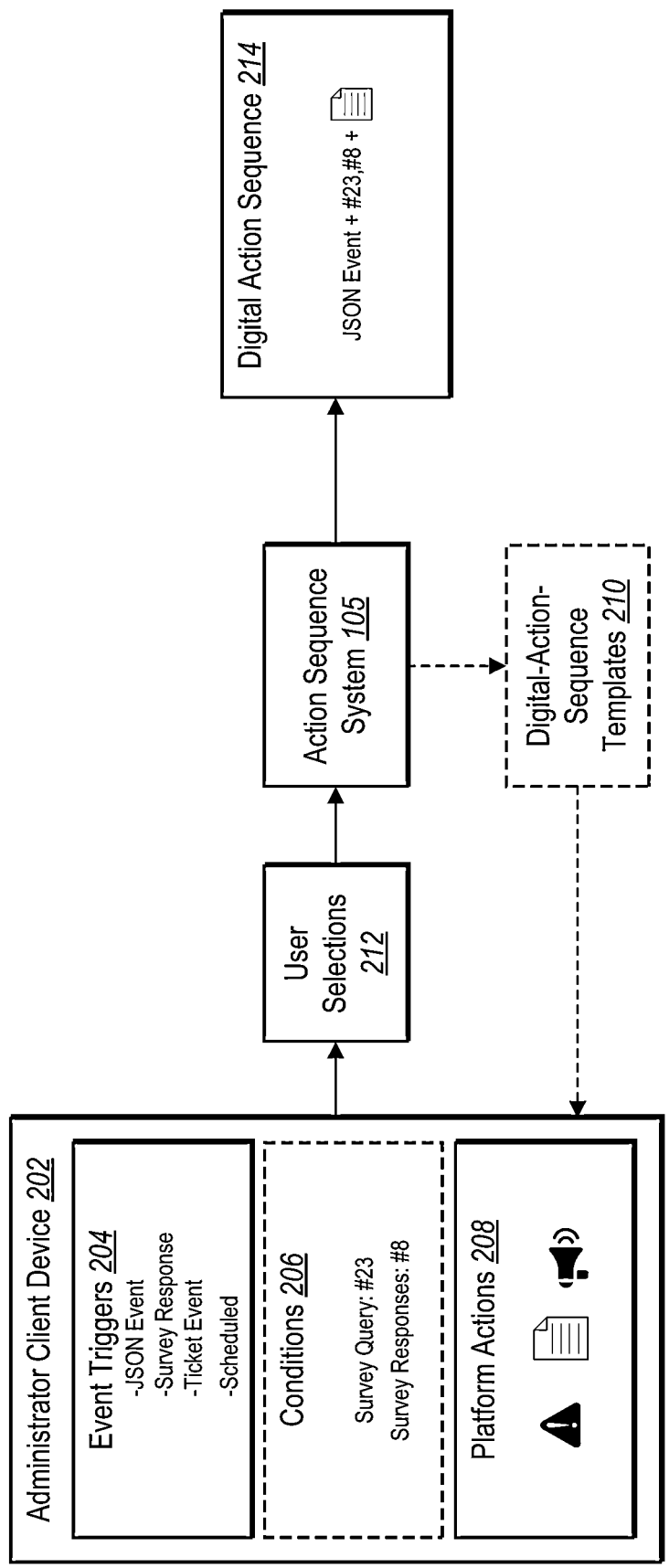
FIG. 2 illustrates an action sequence system generating a digital action sequence based on selections from a client device via a sequence-builder-user interface in accordance with one or more embodiments.

FIG. 2 illustrates the action sequence system 105 generating a digital action sequence 214 based on selections from a client device via a sequence-builder-user interface in accordance with one or more embodiments. As shown in FIG. 2, the action sequence system 105 provides an administrator client device 202 with event triggers 204, conditions 206, and platform actions 208 as part of a sequence-builder-user interface. Based on user selections from among the event triggers 204, the conditions 206, and the platform actions 208, the action sequence system 105 generates a digital action sequence 214. Each is discussed in turn.

In some embodiments, the administrator client device 202 provides, for display, a presentation of the sequence-builder-user interface comprising the event triggers 204 that include a variety of different domain events or digital circumstances that are selectable as prerequisites to performing a platform action as part of a digital action sequence. For example, in some embodiments, the event triggers 204 are tied to a digital activity in relation to a certain data object. These types of event triggers are represented by the following example expression: software (or service)+data object+event. As just set forth, the term software represents which platform is initiating the event of the event trigger. The term data object represents the entity that the platform is generating, modifying, or otherwise acting upon. The term event represents the actual digital act being performed in relation to the data object.

As an example of these components, an event trigger may include a survey management platform (e.g., a Qualtrics® platform)—which is the software component of the event trigger in some embodiments—identifying a certain survey response (the event component) to a digital survey (the data object component). As another example, an event trigger may include a messaging platform (e.g., a Slack® platform)—which is the software component of the event trigger in certain cases—transmitting (the event) a digital communication (the data object component). In yet another example, an event trigger may include a digital sales platform (e.g., a Salesforce® platform)—which is the software component of the event trigger—identifying an electronic communication (the event) comprises an opt-out selection (the data object). Further examples of event triggers are described below in relation to FIGS. 3B-3D.

Additionally or alternatively, the event triggers 204 comprise other components. For example, the event triggers 204 can include one or more time-based elements as part of a scheduled event trigger. To illustrate, the event triggers 204 may include a trigger that occurs based on a predetermined or adjustable schedule. As another example the event triggers 204 may include inbound webhook triggers. In one or more embodiments, inbound webhook triggers comprise a custom endpoint for the action sequence system 105 to receive date or computer-executable instructions from third-party systems triggering digital action sequences via a Hypertext Transfer Protocol (HTTP) call.

As further shown, in some embodiments, the administrator client device 202 provides, for display, a presentation of the sequence-builder-user interface comprising the conditions 206 that include one or more optional parameters or rules. If the action sequence system 105 detects that these parameters or rules are satisfied, the action sequence system 105 can perform a platform action upon identifying an event trigger. That is, the conditions 206 comprise selectable options that, if selected, the action sequence system 105 must identify prior to performing a platform action. Accordingly, if the action sequence system 105 does not detect a condition selected as part of a digital action sequence, in some embodiments, the action sequence system 105 does not perform the platform action.

As described below in relation to FIGS. 3E-3H, certain embodiments of a condition include Boolean-type rules that categorically identify the type of condition. Examples of these types of conditions include a question-type parameter, an embedded-data-type parameter, a quota-type parameter, or a status-type parameter. Question-type parameters define a condition based on a query and a response to the query. Embedded-data-type parameters define a condition based on data corresponding to (e.g., embedded within) an internal or external platform. Quota-type parameters define a condition based on numerical counts or instances that correspond to a quota (e.g., a number of survey responses). Status-type parameters define a condition based on a type of survey response collected. By detecting selection and configuration of such conditions, among other things, the action sequence system 105 can selectively perform platform actions in relation to highly configurable, specific circumstances.

In one or more embodiments, the administrator client device 202 provides, for display, a presentation of the sequence-builder-user interface comprising the platform actions 208 that include a variety of actions, modifications, processes, or operations for performing across one or more platforms. In some embodiments, each platform action corresponds to a single, discrete platform action such that platform actions can be combined in myriad different configurations. In particular embodiments, a platform action is represented by the following example expression: software (or service)+activity+data object. As discussed above, the term software represents which platform is initiating the event of the event trigger, and the term data object represents the entity that the platform is generating, modifying, or otherwise acting upon. In addition, the term activity represents the digital act (and/or the nature of the digital act) being performed in relation to the data object.

As an example of these components, a platform action may include an alert response platform (e.g., a Jira® platform)—which is the software component of the platform action in some embodiments—generating or transmitting (the activity component) an issue alert (the data object). As another example, a platform action may include a ticket response platform (e.g., a Zendesk® platform)—which is the software component of the platform action in certain cases—generating (the activity component) a digital ticket (the data object component). In yet another example, a platform action may include an experience management platform (e.g., a Qualifies® platform)—which is the software component of the platform action—updating (the activity component) a contact directory (the data object). Further examples of platform actions are described below in relation to FIGS. 3I-3N.

In addition or in the alternative to providing the administrator client device 202 with the event triggers 204, the conditions 206, and the platform actions 208 as separate selectable options, the action sequence system 105 can provide digital-action-sequence templates 210 to the administrator client device 202 for user selection. In some embodiments, the digital-action-sequence templates 210 comprise pre-matched or pre-curated combinations of at least one event trigger and at least one platform action generated and arranged together for user selection. In certain implementations, the digital-action-sequence templates 210 comprise pre-generated combinations of a respective event trigger and a respective platform action specially selected for surfacing to a particular user device or user account associated with a user. In certain instances, the digital-action-sequence templates 210 also include one or more pre-generated (e.g., default) conditions.

In one or more embodiments, the action sequence system 105 generates the digital-action-sequence templates 210 utilizing a specially trained machine-learning model. Specifically, once trained, the machine-learning model can dynamically process template parameters to predict which combinations of event triggers, conditions, and/or platform actions to surface to the administrator client device 202. A template parameter can include user-generated parameters or system-detected parameters that are analyzed or processed by the machine-learning model. Examples of template parameters can include a user-account-type identifier, a department-type identifier, digital user activity, metadata corresponding to the event trigger or the platform action, a feature or service of a digital orchestration platform selected by a user account within a threshold time period, or a type of a digital survey selected or distributed by the user account.

The following couple paragraphs describe the examples of template parameters in more detail. For instance, the user-account-type identifier can comprise indications of accounts corresponding to one or more access privileges based on roles (e.g., administrator roles, entry-level roles, manager roles). Similarly, the department-type identifier can comprise indications of certain types of organizational departments (e.g., human-resources department, product-development department, customer service department). In addition, digital user activity can include a variety of different indications of user action, such as clickstream data, website visits, survey responses, search queries, etc. Similarly, a template parameter can include user profile information, such as location, state of residency, political party affiliation, hobbies, employer industry, etc.

As a further example of template parameters, the metadata can include labels, annotations, digital tags, metrics, network information, or profile information that includes or relates to an event trigger, platform action, or condition. For example, the metadata may include or identify timestamp data, message content, attachments, routing information, device identifiers (e.g., IP address), geographic location identifiers, formats, protocols, etc. in relation to an event trigger, platform action, or condition. Additionally, a template parameter can include a software feature or service of a digital orchestration platform that a user implemented, shared, or accessed within some recent time period (e.g., within the past 24 hours, 3 days, or month). Further, a template parameter can include a type of digital survey selected or distributed by the user account. For example, the length or sophistication (e.g., word count, number of queries) of the digital survey may indicate an in-depth type of digital survey versus a mobile-optimized type of digital survey. Similarly, a template parameter can include previous digital action sequences generated or saved in association with a user account.

As noted above, in some cases, the action sequence system inputs one or more of the template parameters above into a machine-learning model to generate predicted combinations of event triggers and platform actions for digital-action-sequence templates. To illustrate an example, the action sequence system 105 may utilize a neural network that processes one or more template parameters discussed above to generate template-relevancy scores that correspond to respective combinations of event triggers, conditions, and/or platform actions. In this example, each template-relevancy score represents a predicted relevancy or probability that a user will select or implement a given combination of an event trigger, a conditions, and/or a platform action. Accordingly, the neural network can select a subset of combinations of event triggers, conditions, and/or platform actions based on template-relevancy scores corresponding to the subset of combinations satisfying a threshold template-relevancy score and/or exceeding other template-relevancy scores. Subsequently, the action sequence system 105 can then surface digital-action-sequence templates to the administrator client device 202 based on the selected subset of combinations of event triggers, conditions, and/or platform actions from the neural network.

To train such a neural network, the action sequence system 105 can provide training template parameters (similar to the template parameters just discussed) to the neural network. Upon processing the training template parameters, the neural network can generate one or more predicted combinations of an event trigger, a condition, and/or a platform action. Subsequently, the action sequence system 105 can compare the predicted combinations of an event trigger, a conditions, and/or a platform action to one or more ground truth combinations of an event trigger, a condition, and/or a platform action (e.g., based on actually implemented digital-action-sequence templates) utilizing a loss function.

Examples of the loss function can include a regression loss function (e.g., a mean square error function, a quadratic loss function, an L2 loss function, a mean absolute error/L1 loss function, mean bias error, etc.). Additionally or alternatively, the loss function can include a classification loss function (e.g., a hinge loss/multi-class SVM loss function, cross entropy loss/negative log likelihood function). In certain instances, for a decision tree, for instance, the loss function includes the Gini Index. Further, the loss function can return a loss comprising quantifiable data regarding the difference between the predicted combinations of an event trigger, a condition, and/or a platform action and the ground truth combinations of an event trigger, a condition, and/or a platform action. In particular, the loss function can return the loss to the neural network where the action sequence system 105 can adjust various parameters/weights to improve the quality/accuracy of the predicted combinations of an event trigger, a condition, and/or a platform action by reducing the loss (e.g., via backpropagation).

In response to user interactions with one or more of the event triggers 204, the conditions 206, the platform actions 208, and/or the digital-action-sequence templates 210 within a sequence-builder-user interface, the action sequence system 105 identifies corresponding user selections 212 from the administrator client device 202. In particular, the action sequence system 105 generates the digital action sequence 214 based on the user selections 212. For example, the action sequence system 105 generates the digital action sequence 214 by combining an event trigger, a platform action, and (optionally) a condition according to the user selections 212. Once generated, the digital action sequence 214 is live and ready for execution (e.g., as described more below in relation to FIG. 4).

In one or more embodiments, the action sequence system 105 generates the digital action sequence 214 in myriad different configurations according to the user selections 212. For example, in some embodiments, the action sequence system 105 combines multiple event triggers, multiple platform actions, and/or multiple conditions according to the user selections 212. Similarly, in some embodiments, the action sequence system 105 generates the digital action sequence 214 by using a selected digital-action-sequence according to the user selections 212.

Figure 3A:
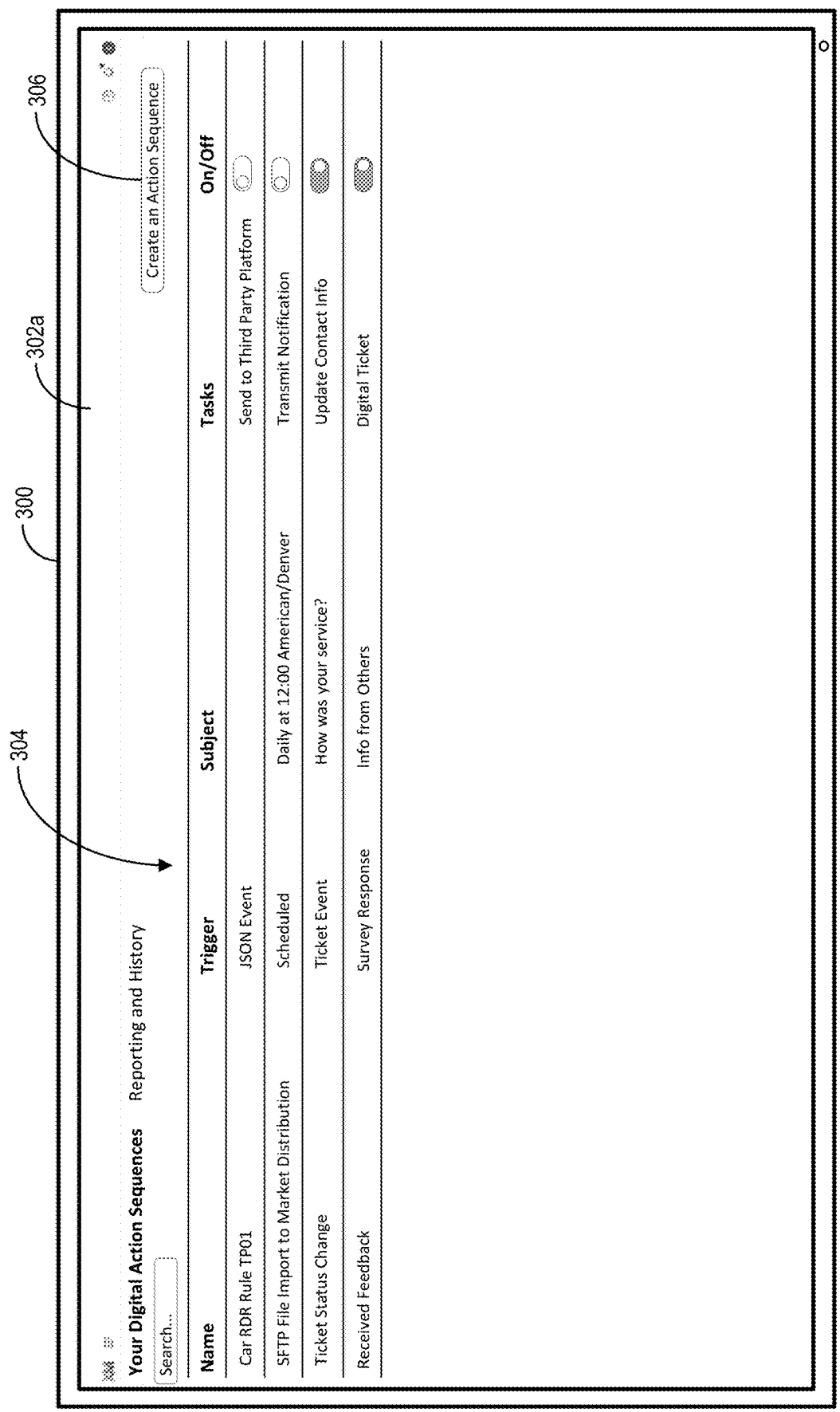
FIGS. 3A-3N illustrate an action sequence system providing sequence-builder-user interfaces on a computing device in accordance with one or more embodiments.
Figure 3B:
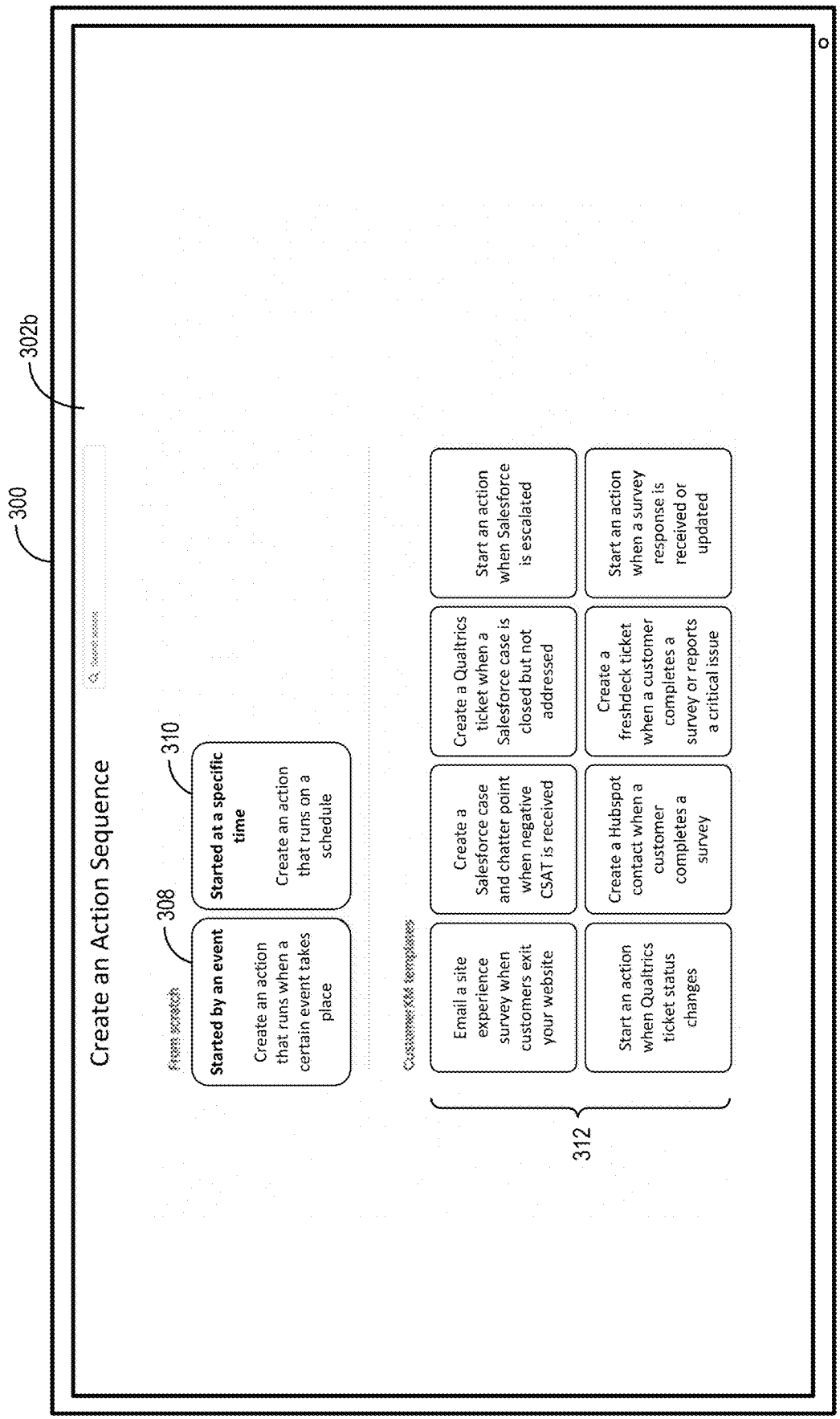
Figure 3C:
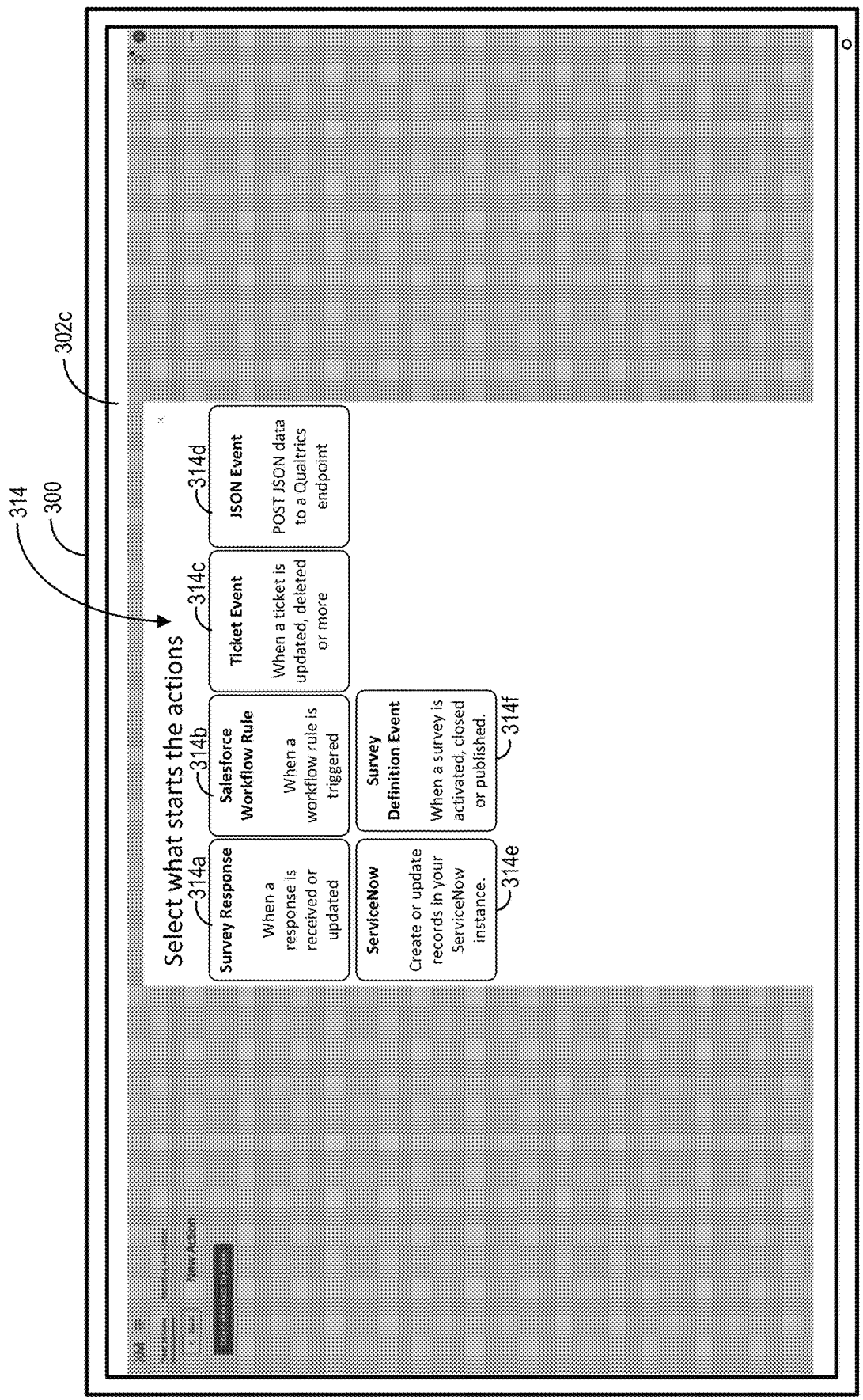
Figure 3D:
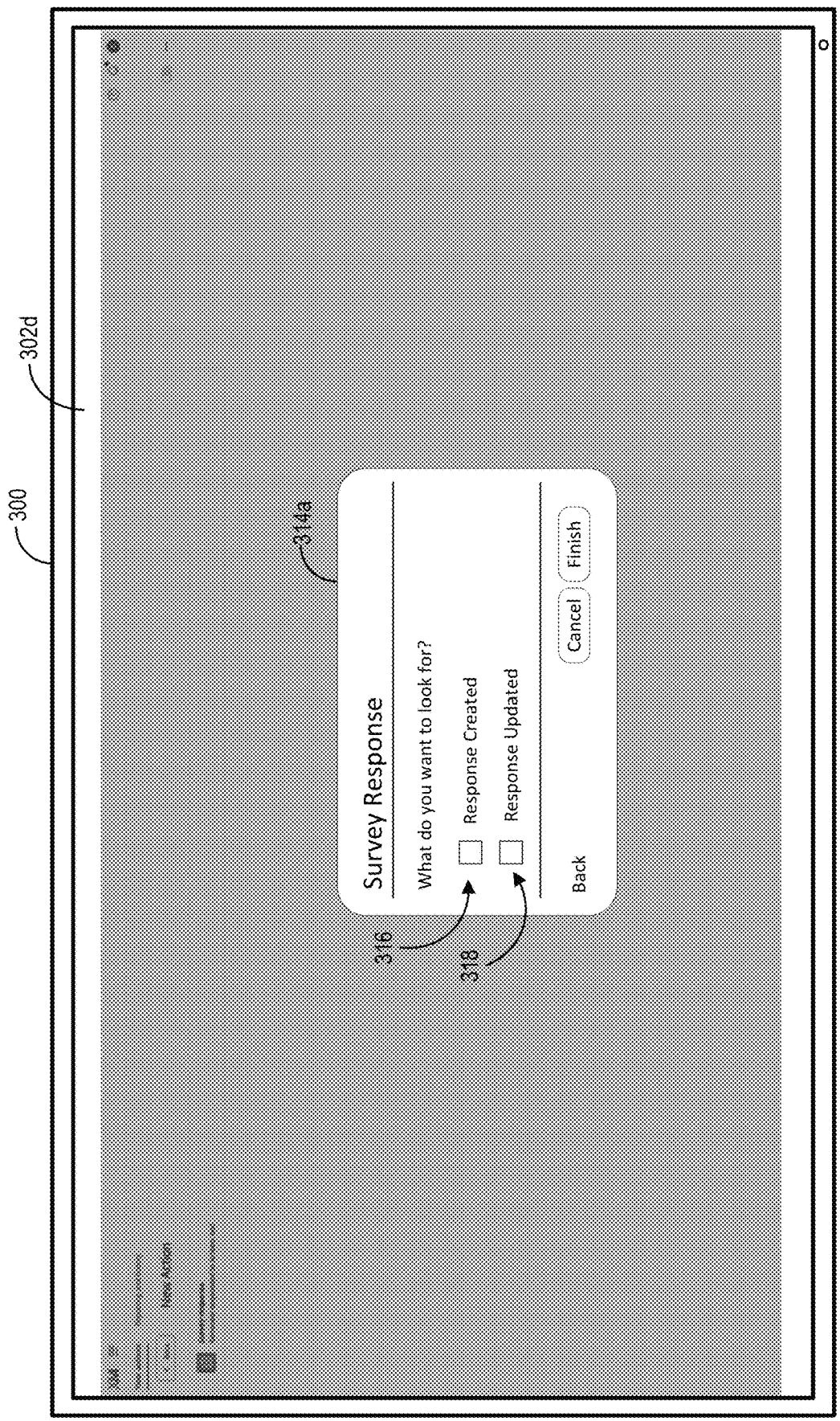

As discussed above, the action sequence system 105 can generate a digital action sequence according to user selections provided via a graphical user interface—namely a sequence-builder-user interface. FIGS. 3A-3N illustrate the action sequence system 105 providing sequence-builder-user interfaces (or graphical user interfaces) 302a-302n on a computing device 300 in accordance with one or more embodiments. As an overview, FIG. 3A depicts a presentation of a sequence-builder-user interface for generating, viewing, or managing digital action sequences. In addition, subsequent figures depict presentations of a sequence-builder-user interface for selecting or configuring an event trigger for a digital action sequence (in FIGS. 3B-3D), selecting or configuring a condition for a digital action sequence (in FIGS. 3E-3H), and selecting or configuring a platform action for a digital action sequence (in FIGS. 3I-3N).

In these or other embodiments, the computing device 300 comprises a client application (e.g., the administrator client application 108) including computer-executable instructions that (upon execution) cause the computing device 300 to perform certain actions depicted in the figure, such as instantiating various presentations of a graphical user interface of the client application. This disclosure will generally refer to either the action sequence system 105 or the computing device 300 performing the actions depicted in the figures described below, but will reference the computing device 300 without noting or further describing the computer-executable instructions in the client application for simplicity.

As shown in FIG. 3A, the computing device 300 presents the user interface 302a comprising digital action sequences 304 that the action sequence system 105 previously generated or recommended. Moreover, via the user interface 302a, the computing device 300 can identify user inputs to modify and/or manage the digital action sequences 304. For example, the computing device 300 can toggle on and off (e.g., activate or deactivate) one or more of the digital action sequences 304 in response to user input. Additionally, for example, the computing device 300 can select one or more of the digital action sequences 304 for the action sequence system 105 to modify (e.g., by modifying a corresponding event trigger, platform action, and/or condition). Further, in some embodiments, the computing device 300 can delete, share, hide, duplicate, or perform a variety of other actions in relation to the digital action sequences 304—all from the user interface 302a.

As indicated in FIG. 3A, the user interface 302a comprises an action-sequence-creation option 306. In response to user input at the action-sequence-creation option 306, the computing device 300 presents the user interface 302b as depicted in FIG. 3B. FIGS. 3B-3D depict presentations of a sequence-builder-user interface for selecting an even trigger. In particular, FIG. 3B shows the user interface 302b comprises two options to generate an event trigger—one according to desired configurations and another according to a predetermined or sample digital-action-sequence template. Selectable options 308-310 correspond to generating an event trigger according to user-specified configurations. In contrast, digital-action-sequence templates 312 correspond to pre-configured combinations of event triggers, platform actions, and/or conditions specially selected for the computing device 300.

As indicated by FIG. 3B, upon detecting a selection of the selectable option 308, the computing device 300 presents a graphical user interface for constructing a digital action sequence based on an event trigger comprising an event detected within one or more platforms (as described further below in relation to FIG. 3C). For example, based on receiving an indication of a user selection of the selectable option 308, the action sequence system 105 can provide the computing device 300 with an array of selectable event trigger options as will be described below in relation to FIG. 3C. Indeed, in some cases, the action sequence system 105 causes the computing device 300 to present the user interface 302c in response to a user selection of the selectable option 308.

FIG. 3B also depicts the selectable option 310 as an example of an option for an additional user-generated event trigger. Upon detecting a use selection of the selectable option 310, the action sequence system 105 causes the computing device 300 to update the user interface 302b to include tools for generating a digital sequence action using an event trigger based on a specific time. For instance, via the selectable option 310, the computing device 300 may identify user inputs indicating a scheduled time at which the action sequence system 105 is to initiate a platform action. In other instances, the computing device 300 may identify user inputs indicating more flexible scheduling. This flexible scheduling may include an approximate time period during which the action sequence system 105 can perform a platform action or a hard deadline indicating an expected initiation or completion of a platform action. In certain implementations, with flexible scheduling, the action sequence system 105 can adjustably self-arrange performing platform actions to times when the action sequence system 105 is performing fewer simultaneous platform actions. In this manner, the action sequence system 105 provides one or more options for event triggers that can reduce peak computer resource consumption and improve device processing speed when performing platform actions.

FIG. 3B also depicts the digital-action-sequence templates 312 as options that include pre-configured options of event triggers. In one or more embodiments, the digital-action-sequence templates 312 comprise a specially curated selection of event triggers and corresponding platform actions relevant to a specific user associated with the computing device 300. As depicted in FIG. 3B, for instance, the digital-action-sequence templates 312 comprise digital-action-sequence templates for emailing a site experience survey upon detecting a website exit, creating a sales case (e.g., within a Salesforce® platform) based on negative customer satisfaction scores, creating a response ticket (e.g., a Qualtrics® ticket) based on sales case discrepancies, starting a sales action (e.g., a Salesforce® action) based on issue escalation, starting an experience management action (e.g., a Qualtrics® experience management action) based on ticket status changes, creating a digital contact (e.g., a Hubspot® contact) when a customer completes a digital survey, creating a digital ticket (e.g., Freshdesk® ticket) when a customer completes a digital survey, or starting an action when a survey response is received or updated.

In other embodiments, albeit not shown in FIG. 3B, the user interface 302b can include myriad other digital-action-sequence templates. Further, in certain embodiments, the action sequence system 105 causes the computing device 300 to surface the digital-action-sequence templates 312 selected on a per-user basis. However, in one or more embodiments, the action sequence system 105 can implement digital-action-sequence templates 312 created or developed in a variety of ways. For example, in certain implementations, the action sequence system 105 receives the digital-action-sequence templates 312 created from internal platforms and/or external platforms. For instance, third-party servers may develop and provide the action sequence system 105 with one or more of the digital-action-sequence templates 312 shown in FIG. 3B. In other instances, the action sequence system 105 generates the digital-action-sequence templates 312 for surfacing to administrator client devices.

In response to identifying a user selection of the selectable option 308 depicted in FIG. 3B, the action sequence system 105 causes the computing device 300 to present the user interface 302c shown in FIG. 3C. In FIG. 3C, the user interface 302c comprises event triggers 314 as selectable options to trigger initiating a platform action in a digital action sequence. Each of the event triggers 314 correspond to a specific event trigger across a variety of different platforms.

For example, an event trigger 314a includes or represents a survey response. Specifically, the event trigger 314a comprises detecting receipt of a survey response or an update to a survey response. The event trigger 314a and corresponding parameters are described further below in relation to FIGS. 3D-3H.

As an additional example, an event trigger 314b includes or represents one or more events identified in relation to a digital sales platform (e.g., the Salesforce® platform). For instance, the event trigger 314b may include the digital sales platform performing an act or workflow operation related to a lead or case, such as closing a case or identifying a lead has converted. In other instances, the event trigger 314b may include the digital sales platform predicting a threshold revenue or threshold amount of web site traffic.

As further shown in FIG. 3C, an event trigger 314c includes a ticket event. In particular embodiments, the event trigger 314c comprises detecting a digital ticket being created, updated, closed, deleted, shared, etc. More specifically, the event trigger 314c may include a comment added, a status changed, a priority changed, a ticket assignment or reassignment, a sub-ticket created or deleted, a root cause changed, an email sent or received, follow-up or investigatory details identified. For example, the event trigger 314c may include identifying that a Qualtrics platform has opened or provided status change to a customer service response ticket based on a threshold number of digital complaints. Additionally, for example, the event trigger 314c may include identifying that a ticket response platform (e.g., a Jira® platform) has closed a response ticket for providing a software patch.

In yet another example of an event trigger, an event trigger 314d relates to JSON web event data. In certain implementations, the event trigger 314d comprises identifying that an experience management platform or a survey management platform (e.g., a Qualtrics® platform) has received data indicative of a web hook. Specifically, the event trigger 314d comprises identifying an inbound HTTP request from a third-party or external platform to initiate a platform action.

As also shown in FIG. 3C, the user interface 302c comprises an event trigger 314e that relates to acts or operations performed on a file record platform (e.g., a ServiceNow® platform. In particular embodiments, the event trigger 314e comprises creating or updating records within the file record platform. For example, the event trigger 314e may include the file record platform opening a new user account or changing contact information for one or more users.

In addition to the event trigger 314e, the user interface 302c further comprises an event trigger 314f that includes or represents a survey definition (or status) event. For example, the event trigger 314f can include identifying a digital survey status changing to or from one or more of activated, closed, or published. As another example, the event trigger 314f can include identifying a digital survey being activated or distributed in a certain manner, such as via SMS messaging or email, via an offline application, or via hyperlink for anonymous responses.

In response to identifying a user selection of the event trigger 314a as shown in FIG. 3C, the computing device 300 presents user interface 302d shown in FIG. 3D. In FIG. 3D, the user interface 302d comprises selectable options 316 and 318 for specifying what type of survey response constitutes the event trigger 314a. Specifically, the selectable option 316 corresponds to a survey response being created (e.g., based on a new response submitted from a respondent client device). Additionally, the selectable option 318 corresponds to a survey response being updated (e.g., via one or more application programming interfaces).

In one or more embodiments, the computing device 300 allows only accepts a single selection of one of the selectable options 316 and 318. In other embodiments, the computing device 300 accepts user selections for both of the selectable options 316 and 318 (e.g., to trigger a platform action based on all survey responses).

Although not shown in FIG. 3D, based on a selection of one or both of the selectable options 316 or 318, the action sequence system 105 can cause the computing device 300 to present one or more digital surveys available for user selection as the relevant survey for which responses will trigger the event trigger 314a. The presented digital surveys may include digital surveys previously generated and/or digital surveys associated with one or more administrator user accounts. Additionally or alternatively, the presented digital surveys may include digital surveys that are currently published and/or are currently open for accessing and submitting survey responses.

Figure 3E:
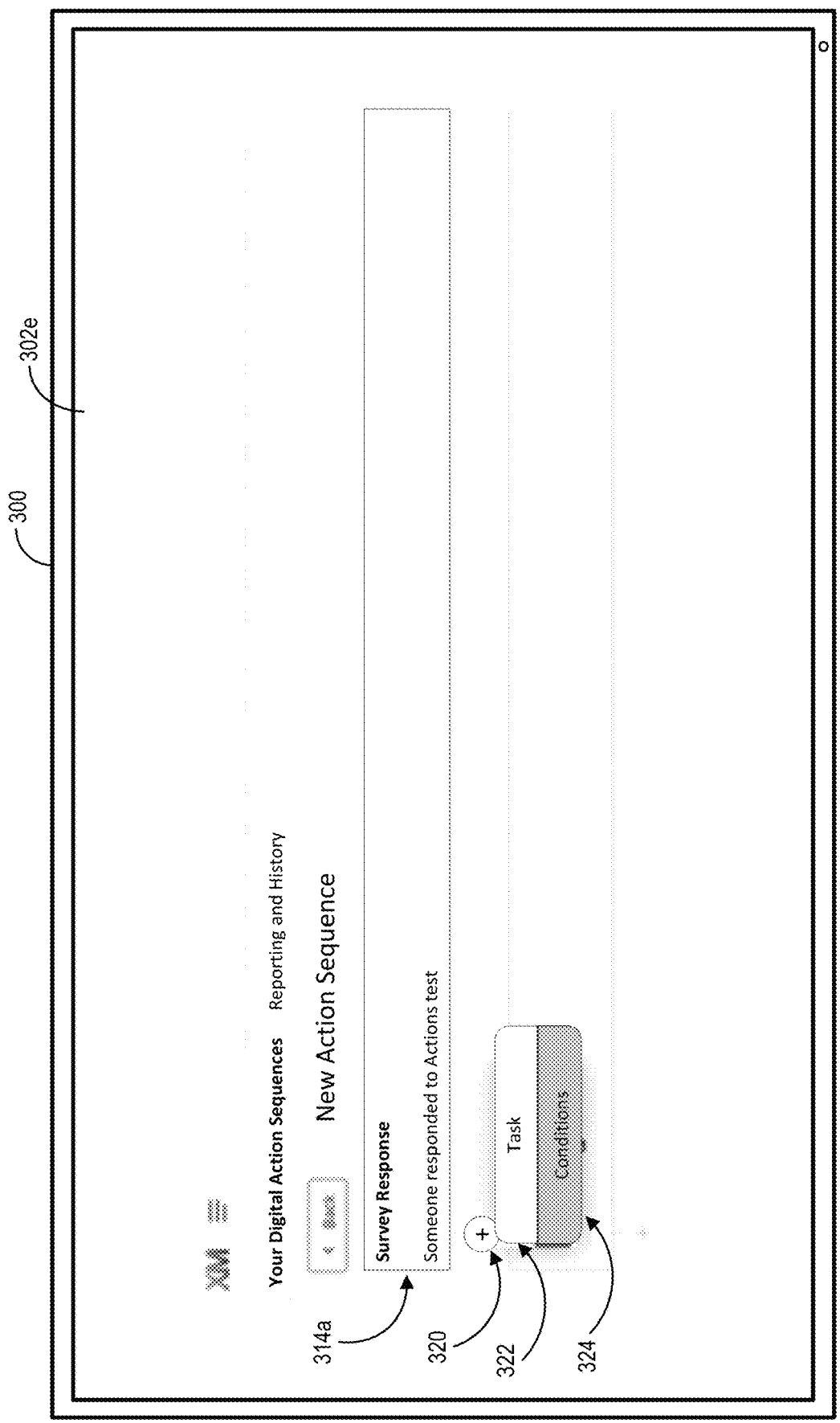

Based on identifying the selectable option 316 for "Response Created" shown in FIG. 3D (and a corresponding digital survey), the computing device 300 presents the user interface 302e shown in FIG. 3E. In FIG. 3E, the user interface 302e comprises the event trigger 314a corresponding to survey responses for the digital survey "Actions test." As indicated in FIG. 3E, "Actions test" is the name of the selected digital survey for which the action sequence system 105 will identify survey responses to determine whether an event trigger is satisfied.

As mentioned above, FIGS. 3E-3H depict user interfaces for indicating a condition of a digital action sequence. Specifically, as shown in FIG. 3E, the user interface 302e comprises an add-selection button 320. In response to detecting user interaction with the add-selection button 320, the computing device 300 presents a task-selection option 322 and a condition-selection option 324. Based on interactions with the task-selection option 322, the action sequence system 105 initiates a series of user interface presentations on the computing device 300 that correspond to selecting one or more platform actions triggered by the event trigger 314a (e.g., as shown in FIGS. 3I-3N). Similarly, based on interactions with the condition-selection option 324, the action sequence system 105 initiates a series of user interface presentations on the computing device 300 that correspond to selecting one or more conditions for performing a platform action (e.g., as shown in FIGS. 3E-H).

Figure 3F:
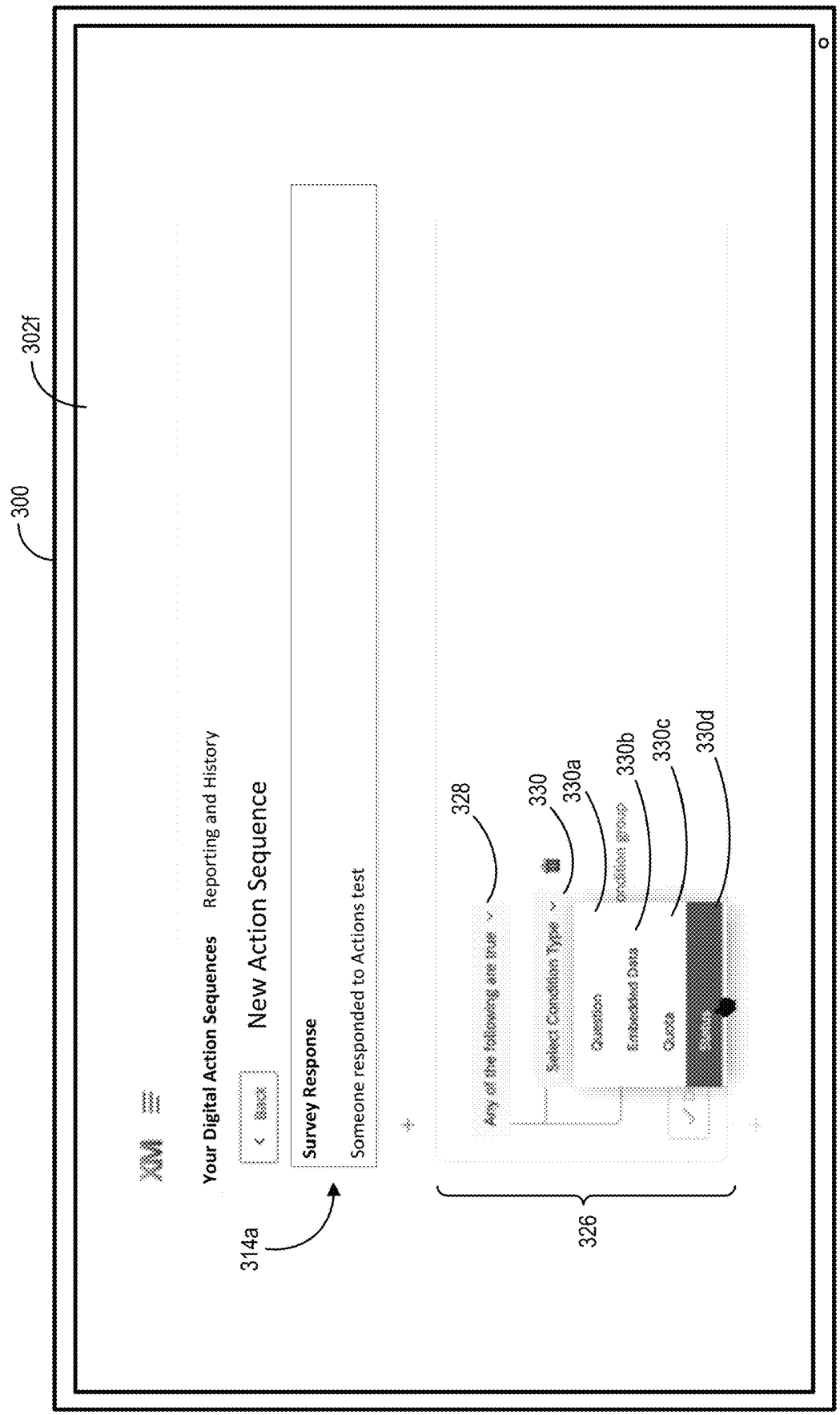

Indeed, in response to or based on identifying a user selection of the condition-selection option 324 depicted in FIG. 3E, the computing device 300 presents the user interface 302f as shown in FIG. 3F. In FIG. 3F, the user interface 302f comprises a condition 326 composed of various parameters. More particularly, and as indicated above, in some cases, the condition 326 comprises parameters or rules. If the action sequence system 105 detects that these parameters or rules are satisfied, the action sequence system 105 can perform a platform action upon identifying an event trigger (e.g., the event trigger 314a). For example, the condition 326 comprises a Boolean-detection rule 328 that (upon application) causes the action sequence system 105 to perform a Boolean query or search for certain types of conditions—namely a query or search for one of condition types 330. Specifically, the Boolean-detection rule 328 comprises Boolean operators, such as true, not true, equal to, greater than, less than, and, or, as well as other operators the action sequence system 105 uses to search for the condition types 330.

To illustrate, by executing or performing actions consistent with the Boolean-detection rule 328, the action sequence system 105 can identify a question-type parameter 330a that indicates the condition 326 is based on how a respondent answered a question. The question-type parameter 330a is described further below in relation to FIGS. 3G-3H.

In addition, when executing or performing actions consistent with the Boolean-detection rule 328, the action sequence system 105 can identify an embedded-data-type parameter 330b that indicates the condition 326 is based on a value of an embedded data field. The embedded data field can include a variety of survey data recorded in addition to survey responses. For example, embedded data can include demographics and other identifying information corresponding to a responded (e.g., as saved within a respondent contact list). As another example, the embedded data can include a social media site that a respondent accessed a digital survey from.

Further, the action sequence system 105 can use the Boolean-detection rule 328 to identify a quota-type parameter 330c that indicates the condition 326 is based on quota counts for quotas in a digital survey. In certain implementations, quotas include numerical representations that the action sequence system 105 uses to represent or track how many respondents meet a condition associated with the digital survey selected for the event trigger 314a. The action sequence system 105 can also use quotas as a gatekeeper-type metric to determine when to perform certain platform actions, such as ending a digital survey prematurely or deleting extra responses not needed for a study.

Additionally, the action sequence system 105 can use the Boolean-detection rule 328 to identify a status-type parameter 330d that indicates the condition 326 is based on a value indicating a type of survey response collected. Example statuses or types of survey responses may include IP address (a normal response), survey preview (a preview response), survey test (a test response), imported (an imported response), spam (a possible spam response), preview spam (a possible spam response submitted through a preview link), imported spam (a possible spam response that was imported), offline (an offline application response), and offline preview (previews submitted through an offline application).

Figure 3G:
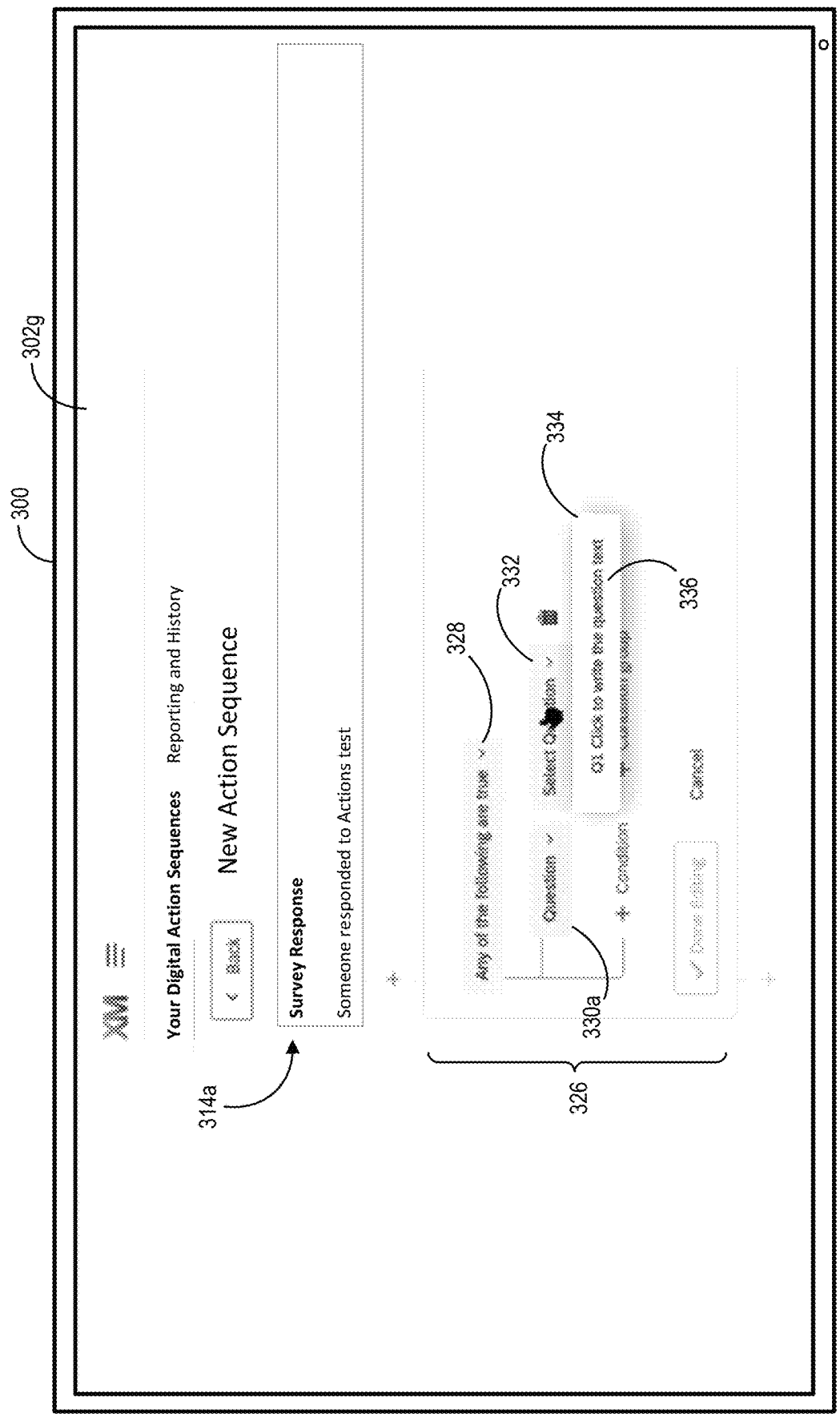

As shown in FIG. 3G, the action sequence system 105 causes the computing device 300 to present a user interface 302g in response to a user selection of the question-type parameter 330a shown in FIG. 3F. Although the following description describes the presentation and selection of parameters corresponding to the question-type parameter 330a, any of the condition types 330 shown in FIG. 3F may be selected along with corresponding parameters.

As shown, the user interface 302g comprises a selectable-draft-query option 332 for further specifying the condition 326. In response to user interaction with the selectable-draft-query option 332, the action sequence system 105 causes the computing device 300 to instantiate a query interface 334 for drafting a custom query 336 (albeit default text is shown in FIG. 3G). For example, in response to a click or tap at the query interface 334, the computing device 300 may surface a cursor or other indication to draft the custom query 336 (e.g., using a keyboard for input). In this manner, the action sequence system 105 can identify a specific question of interest from the digital survey indicated in the event trigger 314a (or a question from a different digital survey).

Figure 3H:
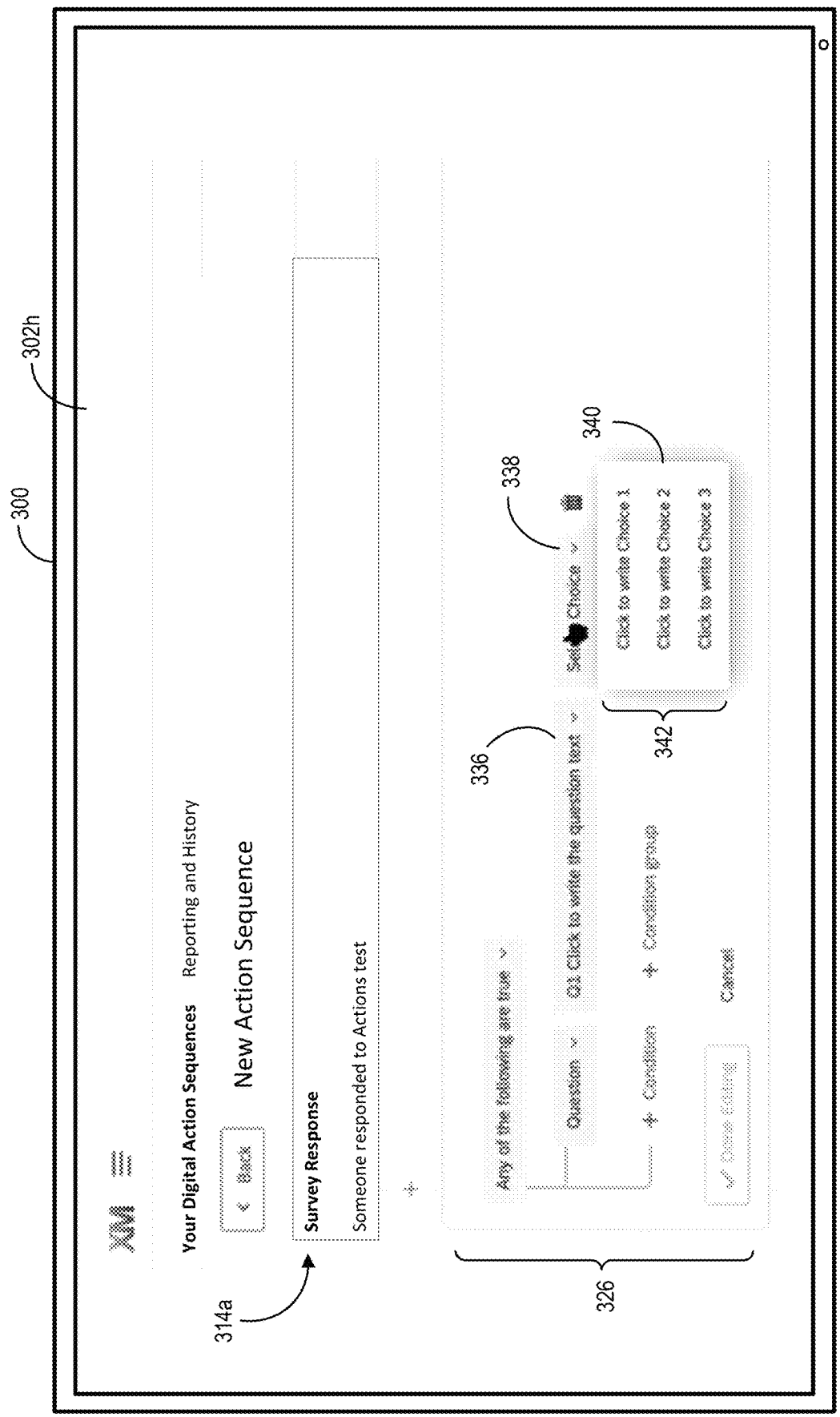

After completion of the custom query 336 discussed above in relation to FIG. 3G, the computing device 300 presents a user interface 302h shown in FIG. 3H. The user interface 302h comprises a selectable-draft-response option 338 for specifying responses (although default responses are shown in FIG. 3H). Specifically, in response to user interaction with the selectable-draft-response option 338, the computing device 300 instantiates a response interface 340 for drafting responses 342. Moreover, in certain implementations, the action sequence system 105 uses the responses 342 to identify a singular response of interest to the custom query 336. In other implementations, the action sequence system 105 uses the responses 342 to identify multiple responses. Additionally, it can be appreciated that the responses 342 correspond to one or more responses in the digital survey indicated in the event trigger 314a (or a response from a different digital survey).

Figure 3I:
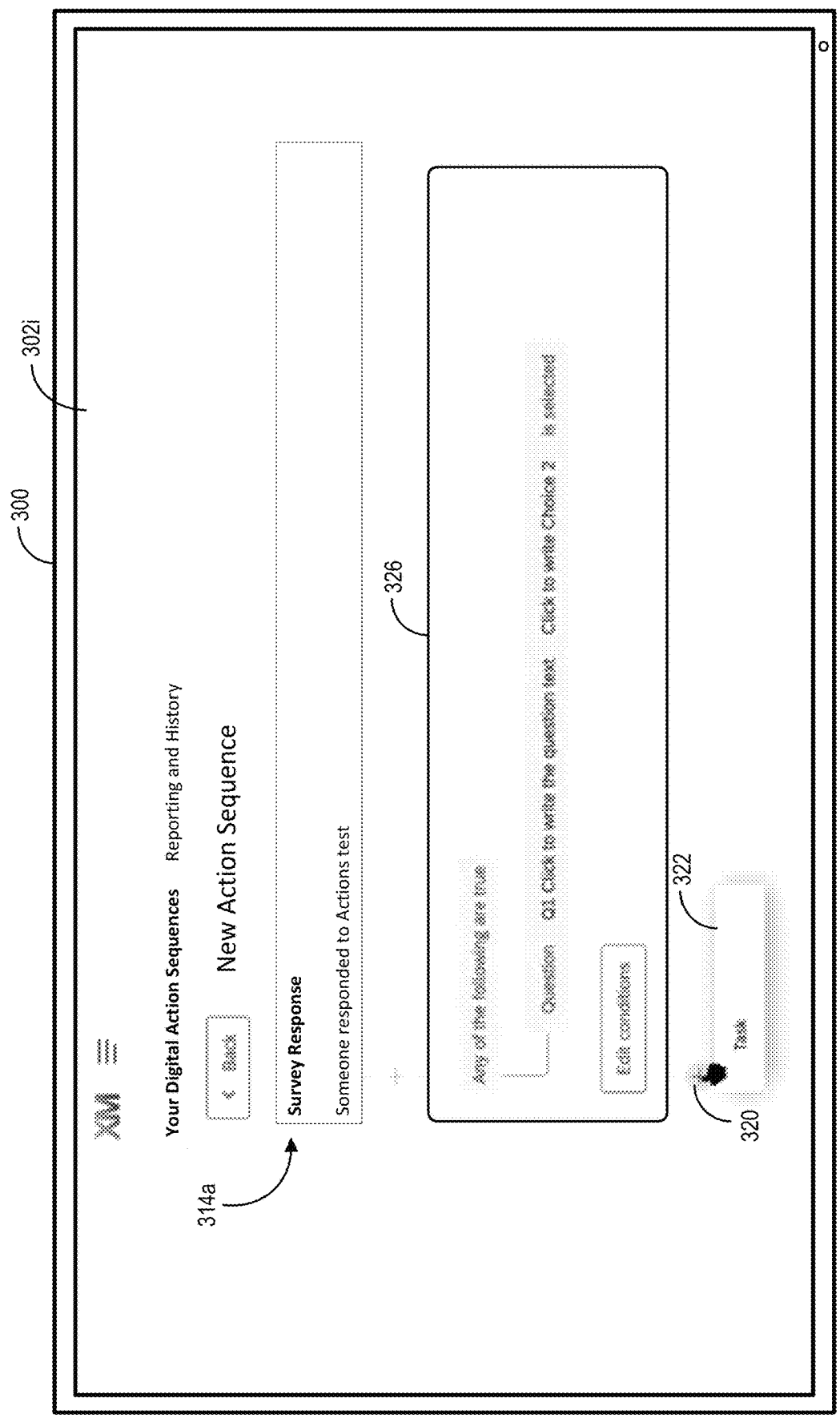

Based on identifying selected options indicating the various parameters of the event trigger 314a (as described in FIGS. 3B-3D) and the condition 326 (as described in FIGS. 3E-3H), the action sequence system 105 can define one or more platform actions as part of a digital action sequence. FIGS. 3I-3N depict graphical user interfaces for indicating such platform action(s). In particular, FIG. 3I shows a user interface 302i comprising a selection of both the event trigger 314a and the condition 326 for a new digital action sequence. One or both may be modified according to further user input (e.g., via "edit conditions" or reselecting the event trigger 314a). Otherwise, as shown in FIG. 3I, the action sequence system 105 can initiate a series of presentations for selecting one or more platform actions in response to user interaction with the add-selection button 320 and the task-selection option 322.

Figure 3J:
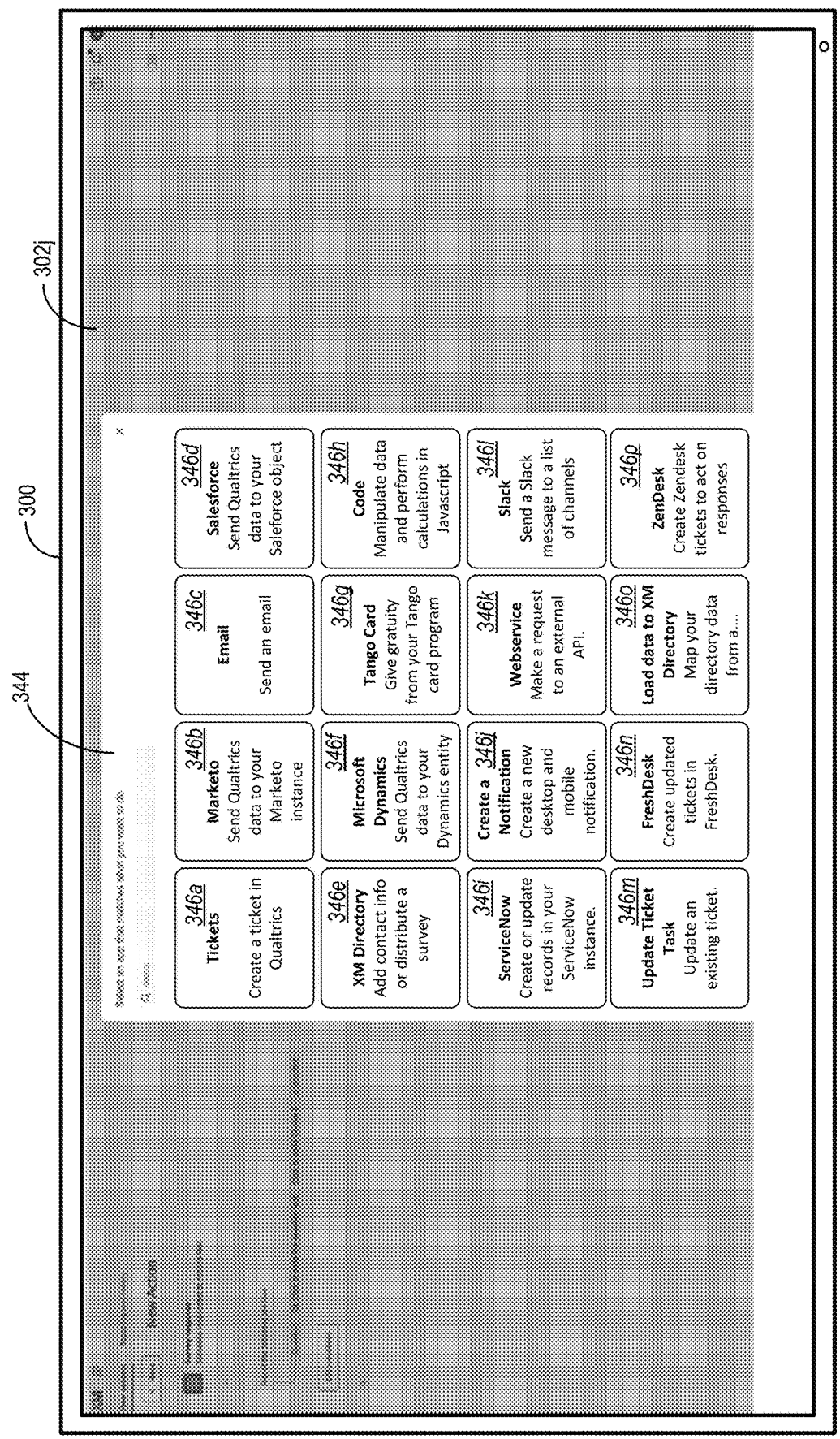

In response to identifying the user selection of the task-selection option 322 in the user interface 302i depicted in FIG. 3I, the action sequence system 105 causes the computing device 300 to present a user interface 302j depicted in FIG. 3J. As shown in FIG. 3J, the user interface 302j comprises a platform-action catalog 344 with platform actions 346a-346p. The platform actions 346a-346p include or represent selectable options for specific actions, modifications, processes, or operations across a variety of different platforms. Moreover, and as described above, a selected platform action is what the action sequence system 105 performs in response to detecting the event trigger 314a and parameters of the condition 326 are satisfied.

The following five paragraphs describe examples from the platform actions 346a-346p. For instance, the platform action 346a comprises an option for generating a digital ticket (described more below in relation to FIG. 3K). Additionally, the platform action 346b comprises an option for transmitting data (e.g., experience management data, survey response data) from an experience management platform to a marketing platform (e.g., a Marketo® platform). By contrast, the platform action 346c comprises an option for sending an email notification to a particular computing device or group of computing devices. For instance, the platform action 346a may include a report of what a customer said about their support interaction, confirmation and details of event registration, or a weekly reminder. Further, the platform action 346d comprises an option for transmitting data (e.g., experience management data, survey response data) from a survey management platform to a digital sales platform. For instance, the platform action 346d may include mapping responses from digital surveys in the survey management platform to specific records (e.g., lead databases) within a digital sales platform.

In addition to the platform actions 346a-346d, as shown in FIG. 3J, the action sequence system 105 causes the computing device 300 to further present platform actions 346e-346h. For example, the platform action 346e comprises an option for adding contact information or distributing a digital survey (e.g., a follow-up survey). For instance, the platform action 346e comprises an option for saving or updating contact information and transactional data within an experience management directory of an experience management platform. Further, the platform action 346f comprises an option for transmitting data (e.g., experience management data, survey response data) from a survey management platform to a customer relation platform. For instance, the platform action 346f may include sending survey response data to populate elements of customer insights within a customer insights platform (e.g., a Microsoft Dynamics® platform). The platform action 346g comprises an option for sending an electronic reward to one or more computing devices via a digital rewards platform (e.g., a Tango® platform to incentivize and/or reward survey participation). Further, the platform action 346h comprises an option for performing data operations using JavaScript code. For instance, the platform action 346h can include transforming an API call's return result into a more user-friendly graphical presentation.

In addition to the example platform actions described above, as shown in FIG. 3J, the action sequence system 105 causes the computing device 300 to further present platform actions 346i-346l. For instance, the platform action 346i comprises an option for generating or updating records in a file record platform (e.g., a ServiceNow® platform). Conversely, the platform action 346j comprises an option for transmitting internal or external platform data to a computing device (e.g., a desktop device or mobile device) in the form of a notification. By contrast, the platform action 346k comprises an option for generating a request via an API (e.g., to call data within an internal survey management platform or an external web service). For instance, the action sequence system 105 can perform a platform action 346k based on a "create contact" API call to add a survey respondent to a contact list across one or more platforms. In addition, the platform action 346l comprises sending a message (e.g., a Slack® message) to user devices or a list of channels to quickly disseminate feedback from a digital survey.

As further shown in FIG. 3J, the action sequence system 105 causes the computing device 300 to present platform actions 346m-346p. For instance, the platform action 346m comprises an option for updating an existing digital ticket (e.g., a digital ticket corresponding to a specific ticket key identifier). For instance, the platform action 346m includes the action sequence system 105 escalating or reassigning digital tickets, tagging a digital ticket, or updating certain fields such as the name, score, summary, or various ticket data. By contrast, the platform action 346n comprises an option for creating a digital ticket within a ticket response platform (e.g., a FreshDesk® platform). Conversely, the platform action 346o comprises an option for mapping directory data from a proprietary or third-party source. Finally, the platform action 346p comprises an option for creating a digital ticket within a ticket response platform to act on survey responses.

In addition or in the alternative to the platform actions 346a-346p shown in FIG. 3J, the user interface 302j can include myriad other platform actions, including other platform actions for other platforms (or the same platforms). Further, the platform actions 346a-346p (and/or the event triggers 314a-314e) can be created or developed in a variety of ways. For example, the platform actions 346a-346p (and/or the event triggers 314a-314e) can be created via internal platforms and/or external platforms. For instance, third-party servers may develop and provide the action sequence system 105 with one or more of the platform actions 346a-346p shown in FIG. 3J. In other instances, the action sequence system 105 generates the platform actions 346a-346p for surfacing to administrator client devices.

As depicted in FIG. 3J, the client device 300 can detect a user selection of any of the platform actions 346a-346p. In response to identifying a user selection of the platform action 346a, for example, the action sequence system 105 causes the computing device 300 to present a user interface 302k shown in FIG. 3K. In particular, FIG. 3K shows the user interface 302k comprising ticket-generation parameters 348 for creating a new ticket task. In one or more embodiments, the platform action 346a includes options for assigning ownership of a response task to an individual or role for responding to an event or addressing an issue. Moreover, as shown, the ticket-generation parameters 348 comprise various fields for generating a digital ticket, such as a ticket priority, ticket name, ticket group, owner (e.g., administrator email address), ticket score, ticket comments, ticket data, follow-up data, and root cause. Upon completion, the action sequence system 105 can save the ticket-generation parameters 348 for the platform action 346a (e.g., as part of the digital action sequence in one or more memory devices).

Upon receiving indications of user selections of the event trigger 314a, the condition 326, and the platform action 346a, the action sequence system 105 can save these components as a digital action sequence. In the alternative to such selections, a user may select one or more additional event triggers, conditions, and/or platform actions. For example, in response to identifying an additional user selection with the add-selection button 320 (shown in FIG. 3I), the action sequence system 105 can cause the computing device 300 to present a same or similar user interface as the user interface 302j shown in FIG. 3J for selecting an additional platform action to perform upon detecting the event trigger 314a and the condition 326.

Figure 3L:
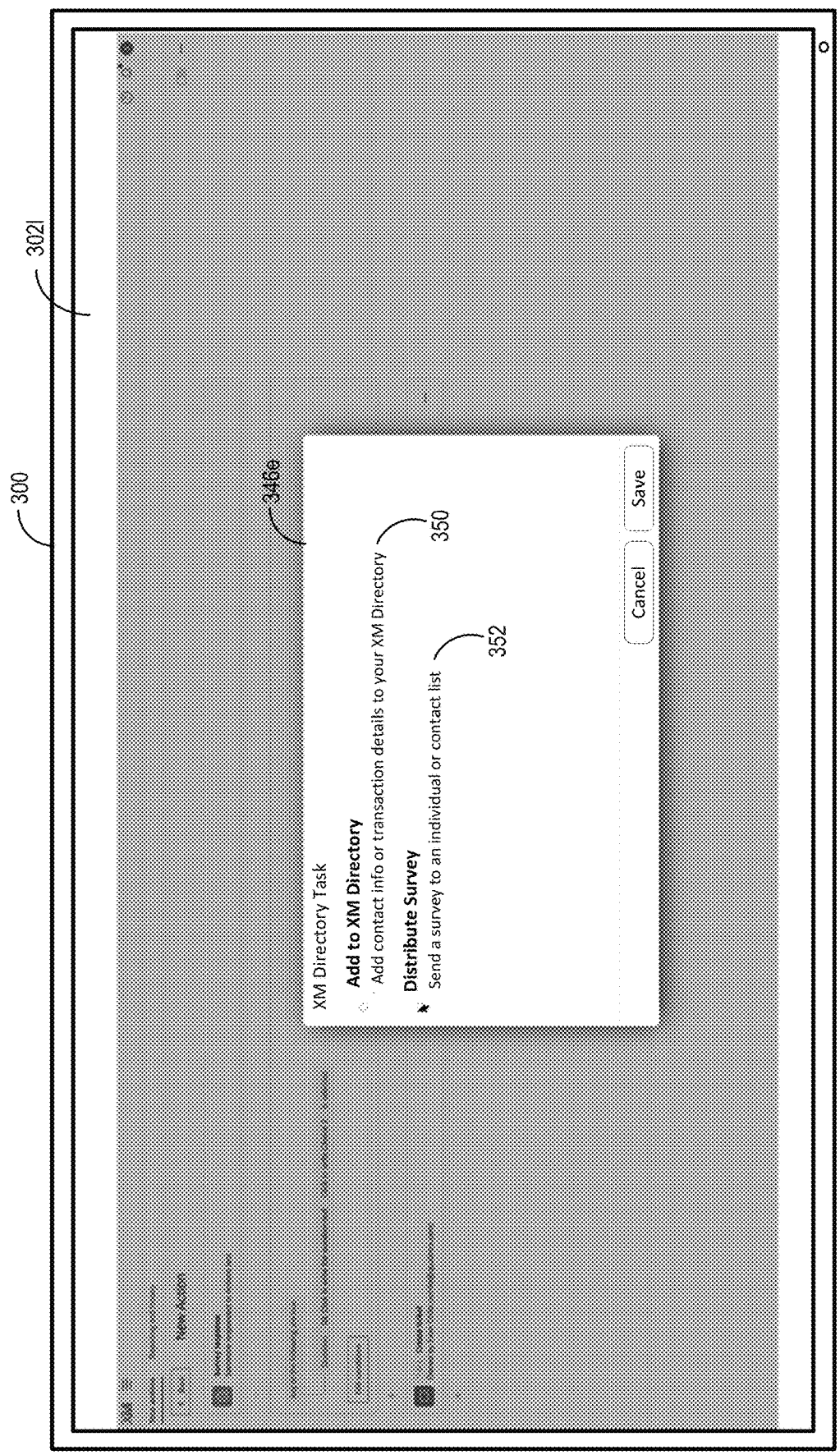
Figure 3M:
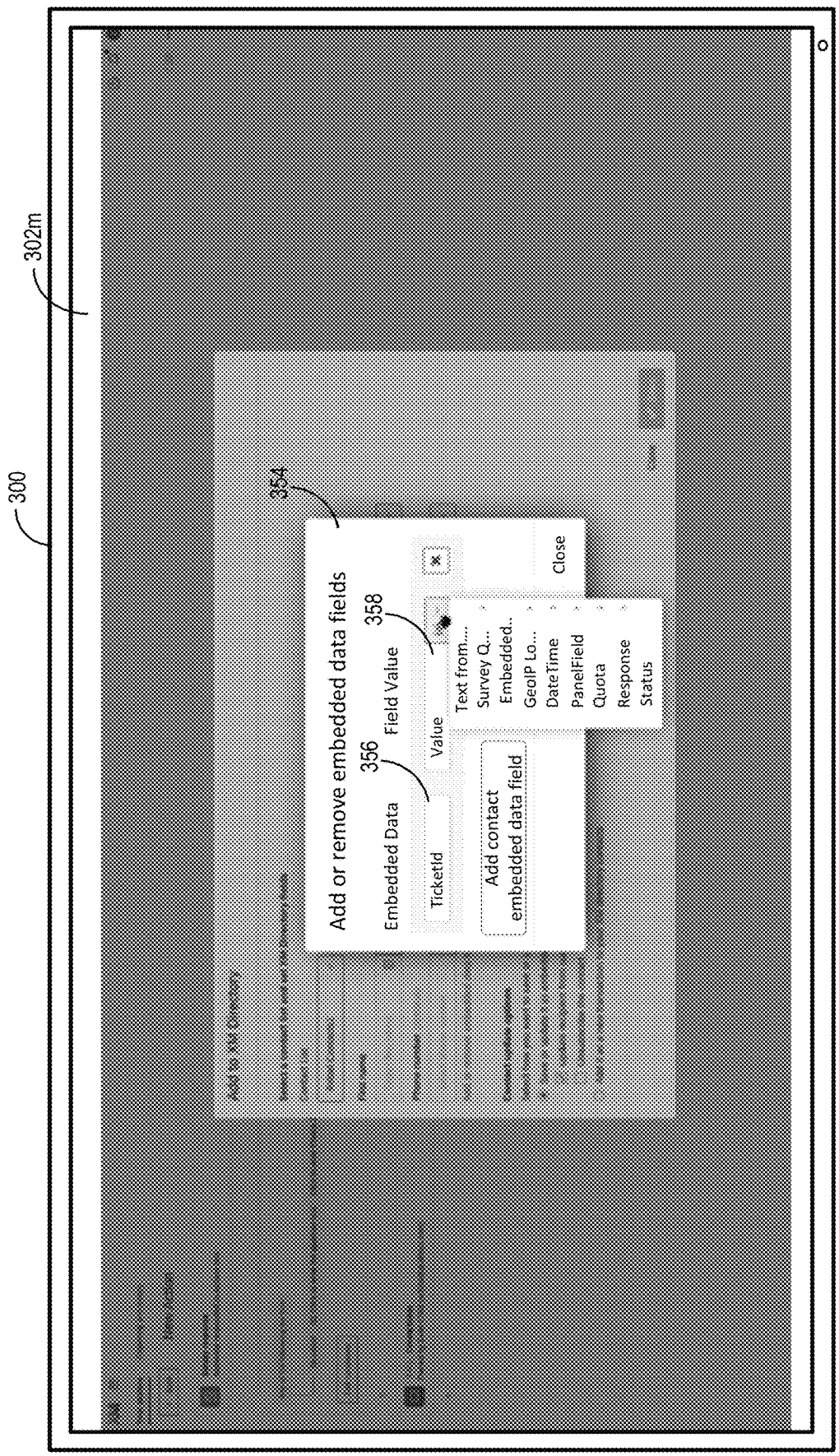
Figure 3N:
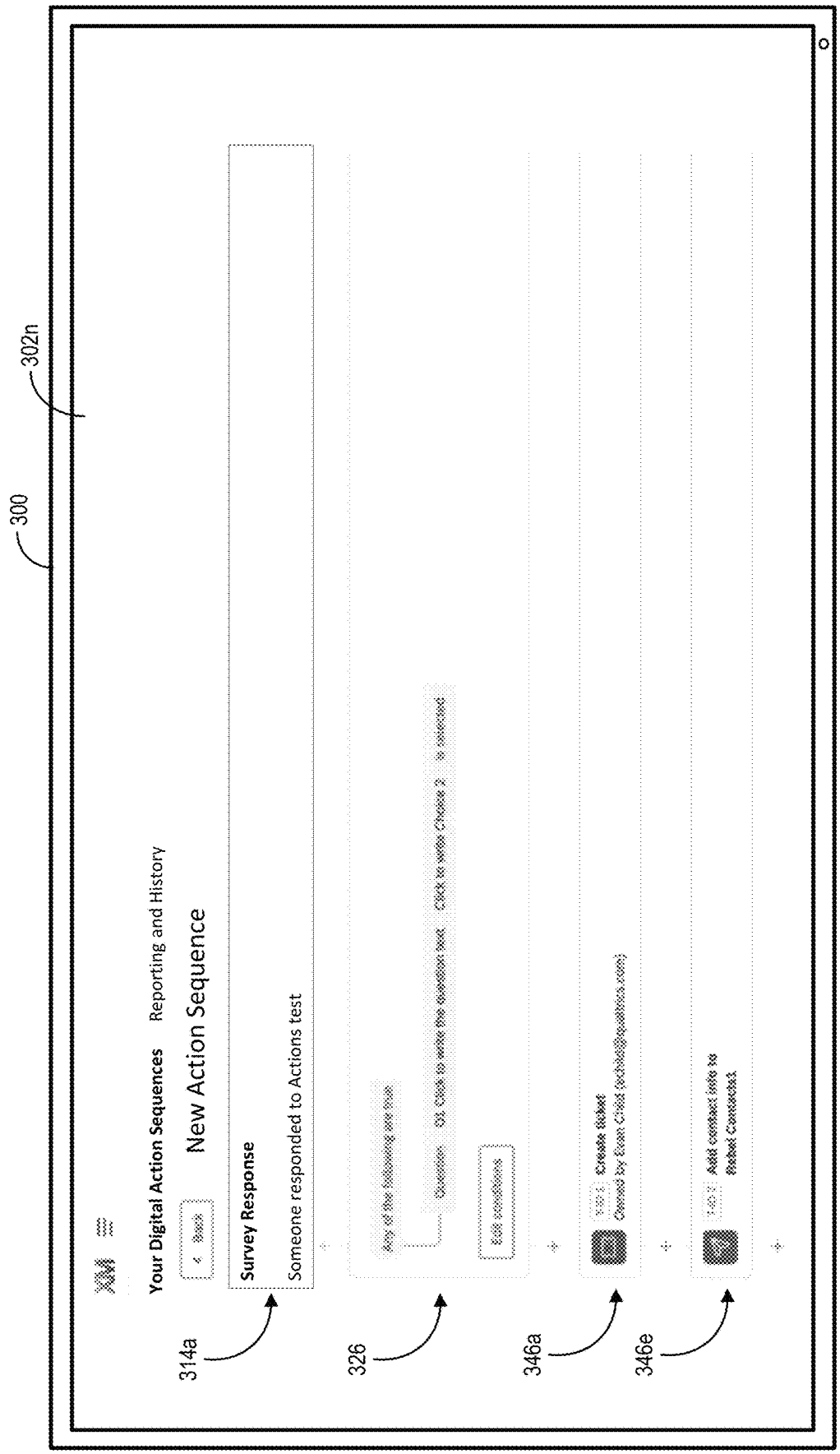

Indeed, the following description of FIGS. 3L-3N discusses identifying an additional platform action for the action sequence system 105 to perform as part of the digital action sequence defined thus far—according to the selections described above for FIGS. 3B-3K. Specifically, based on identifying an additional user selection of the add-selection button 320 depicted in FIG. 3I, for example, the computing device 300 presents the user interface 302l in relation to an experience-management directory or log as shown in FIG. 3L. In particular, the user interface 302l comprises selectable options 350 and 352 for performing the platform action 346e. The selectable option 350 corresponds to an option for adding contact information or transaction details into a user profile of an experience management directory. By contrast, the selectable option 352 corresponds to an option for sending a survey to one or more computing devices associated with an individual or contact list.

Based on identifying a user selection of the selectable option 350 to add contact information to a user profile in an experience management directory—in addition to a user selection of a selectable option to add or remove embedded data fields to the directory, the computing device 300 presents the user interface 302m, as shown in FIG. 3M. As shown in FIG. 3M, the user interface 302n comprises an embedded-data menu 354 for providing embedded data parameters. Specifically, the embedded-data menu 354 comprises an embedded data field 356 and a field value 358. Upon selection or other input from the computing device 300, the embedded data field 356 includes the name of a variable (e.g., Gender, State, Age). The field value 358 is what the embedded data field 356 will be set to in a survey response dataset. Moreover, just as one question can have multiple possible answers, the embedded data field 356 can have multiple possible field values. For instance, an embedded data field referring to "Gender" might have a field value of "Female," "Male," or "Other".

As further shown in FIG. 3M, the field value 358 can include or reference data associated with another platform action (e.g., a prior platform action in a digital action sequence). For example, the action sequence system 105 can pipe (or pull) in data from other datasets relating to other platform actions to associate such data with the additional platform action being defined in FIG. 3M. Examples of other datasets may include a contact list, information appended to a respondent's survey link, built-in fields provided by the server(s) 102, or predetermined values corresponding to survey distribution or survey flow—all associated with one or more other platform actions. Specifically, in the example illustrated in FIG. 3M, the embedded data field 356 of "TicketId" can correspond to a field value of a ticket key identifier for a digital ticket to be generated based on the platform action 346a. In this manner, the platform action 346e can include an option for updating contact information in a user profile of an experience management directory (e.g., an experience management directory named "Rebel Contacts1"). The updated contact information can include ticket information associated with (e.g., piped in from) the preceding platform action 346a of generating a digital ticket—thereby linking platform actions across one or more platforms.

After defining an additional platform action according to user selections as described in relation to FIGS. 3L-3M, the computing device 300 presents the user interface 302n as shown in FIG. 3N. The user interface 302n comprises a digital action sequence composed of the event trigger 314a, the condition 326, the platform action 346a, and the platform action 346e. From this point, the action sequence system 105 can modify, save and/or activate the digital action sequence upon user confirmation. Based on a modified or activated digital action sequence, the action sequence system 105 can then cause the computing device 300 to update the user interface 302a to include the new digital action sequence just created. In addition to a user-interface update, the action sequence system 105 can execute one or more computer-executable instructions to search for and identify the event trigger 314a as part of the digital action sequence (now activated).

As mentioned above, the action sequence system 105 can perform a variety of platform actions based on a detected event trigger as part of a digital action sequence. For example, the action sequence system 105 can transmit an electronic communication, update digital survey distribution data, modify an experience-management log, modify software application code, generate a digital ticket or transmit digital integration data to a third-party server. In accordance with one or more such embodiments, FIG. 4 illustrates the action sequence system 105 performing a platform action as part of a digital action sequence.

As shown at an act 402 in FIG. 4, the action sequence system 105 detects an event trigger. As discussed above for example, the event trigger can include a digital survey response, activation, closing, or publishing of a digital survey, a JSON web event, or an experience management event. Other example event triggers may include creation of a digital content item, a digital event from an external platform, or a user opt-out selection. Accordingly, in one or more embodiments, the act 402 comprises detecting one or more parameters associated with the event trigger. For example, the act 402 may include detecting a completed (or partially completed) survey response to a particular digital survey—all according to the parameters of the event trigger indicated via the sequence-builder-user interface, as described above in relation to FIGS. 3B-D for example.

In response to detecting the event trigger, at an optional act 404, the action sequence system 105 detects whether one or more conditions for performing a platform action are satisfied. As mentioned above, a condition comprises one or more parameters or rules. If the action sequence system 105 detects that these parameters or rules are satisfied, the action sequence system 105 can perform a platform action upon identifying an event trigger at the act 402. If the action sequence system 105 determines that the one or more conditions are satisfied, the action sequence system 105 proceeds to perform the platform action at an act 406. In contrast, if the action sequence system 105 determines that the one or more conditions are not satisfied, the action sequence system 105 does not proceed to perform the platform action at the act 406.

To detect whether the one or more conditions are satisfied, the action sequence system 105 determines whether one or more parameters defining the condition(s) are satisfied (e.g., utilizing a Boolean-detection rule). Take for an example a survey response event trigger detected at the act 402. At the act 404, the action sequence system 105 can analyze at least one of question identifiers (e.g., "Question #23") or the text or alphanumeric characters of a survey query for a survey response submitted. In certain implementations, the analysis includes using optical character recognition, cosine similarity, or machine-learning model approaches. Regardless of the analysis approach, the action sequence system 105 can compare the received survey query with a custom query provided as part of a question-type parameter of a Boolean-detection rule.

Similarly, for example, the action sequence system 105 can analyze response identifiers (e.g., "Answer B") or response values (e.g., text or alphanumeric characters) of responses to a survey query for a survey response submitted. In the analysis, the action sequence system 105 can compare the received responses (or response identifiers) with one or more response values provided as part of a question-type parameter of a Boolean-detection rule. Based on text-based matching or other similarity comparisons in the foregoing analyses, the action sequence system 105 can determine receipt of a survey response that satisfies the conditions provided via the sequence-builder-user interface. Alternatively, for example, the action sequence system 105 detects conditions are satisfied using other types of approaches, depending on the type of condition(s) indicated via the sequence-builder-user interface.

At an act 406, the action sequence system 105 performs a platform action in response to detecting the event trigger at the act 402 and (optionally) detecting that one or more conditions are satisfied at the act 404. As discussed above, the action sequence system 105 can perform a variety of different platform actions. To illustrate, the action sequence system 105 can perform one or more of acts 408-418 (and/or others not illustrated) as applicable and as depicted in FIG. 4.

For example, at an act 408, the action sequence system 105 transmits an electronic communication. To illustrate, the action sequence system 105 can transmit, to a client device, an electronic communication comprising one or more of an SMS message, instant message, e-mail, social media post, etc. In some embodiments, the electronic communication provides a recommendation to perform a platform action, such as a recommendation to distribute an electronic survey or generate an emerging user segment. In other embodiments, the electronic communication provides a warning notification or alert (e.g., that the event trigger occurred). Still, in other embodiments, the electronic communication can include targeted digital content (e.g., promotions, coupons, awards) for one or more client devices associated with the event trigger.

As a further example of a platform action, at the act 410, the action sequence system 105 updates digital survey distribution data. For example, in some embodiments, the action sequence system 105 updates survey distribution data for generating or sending a digital survey specific to client devices corresponding to the detected event trigger. For example, the action sequence system 105 may auto-populate certain survey questions and response choices. Additionally or alternatively, the action sequence system 105 may include certain survey questions and response choices based on the detected event trigger. For instance, the action sequence system 105 may generate a follow-up survey to one or more user devices associated with the detected event trigger. For an event trigger indicating customer dissatisfaction, the follow-up survey may include survey questions that inquire what left the user dissatisfied or what the user would like to have experienced differently. Based on the digital survey generated, the action sequence system 105 can automatically (or upon approval) send the digital survey to one or more client devices corresponding to the detected event trigger.

As yet another example of a platform action, the act 412 comprises modifying an experience-management log (or directory). For example, the action sequence system 105 may dynamically update contact information, a segment size, customer satisfaction score, lifetime value, or other metric associated with client devices corresponding to the event trigger. In certain implementations, the action sequence system 105 performs the act 412 at predetermined intervals or on a rolling basis (e.g., at or near real time in response to detecting the event trigger). Additionally, in some embodiments, the action sequence system 105 can present graphical presentations, such as segment visualizations based on client devices corresponding to the event trigger.

As further shown in FIG. 4, the act 414 comprises modifying software application code. In particular embodiments, the act 414 comprises adding or inserting software code to perform application operations. For example, the act 414 comprises using JavaScript code to perform data manipulation, formatting, and/or calculation operations before or after other platform actions in a digital action sequence. To illustrate the act 414 being combined with another platform action, the action sequence system 105 may perform the act 414 by transforming an API call's return result into a more user-friendly result (e.g., to communicate the result to a non-technical manager). Subsequently, the action sequence system 105 can pipe or otherwise associate that transformed result into the platform action at the act 408 (e.g., an email task) for transmitting the transformed result to the client device of the manager.

When performing the act 416, the action sequence system 105 generates a digital ticket based on the event trigger. In particular embodiments, the digital ticket indicates and tracks one or more tasks to be performed in relation to client devices and users corresponding to the event trigger. For example, the digital ticket may include one or more tasks assigned to a client device of a user associated with technical support, customer support, customer retention, etc. Moreover, in some embodiments, the action sequence system 105 autogenerates and transmits the digital ticket to the assigned client device(s) and/or an administrator device. Additionally, via a client device, the action sequence system 105 can identify user interactions to indicate progress and/or fulfillment of one or more tasks.

As further shown in FIG. 4, the act 418 comprises transmitting digital integration data to a third-party server. As described above, the action sequence system 105 can integrate a variety of different data across platforms. For example, the action sequence system 105 may send survey response data to a messaging platform (e.g., a Slack® platform) for distributing a message to user devices or a list of channels to quickly disseminate feedback from a digital survey. As another example, the action sequence system 105 may generate or update records in a file record platform (e.g., a ServiceNow® platform) based on survey response results from a survey management platform (e.g., a Qualtrics® platform). Myriad other third-party integrations are possible, as described above.

In one or more embodiments, portions of the digital action sequence as just described can also be embedded or ported into third-party applications. For example, the action sequence system 105 can transmit the digital action sequence to the third-party application for complete external integration rather than detecting an event trigger from a third-party application and subsequently performing a platform action internally. To illustrate an example, a digital sales platform (e.g., a Salesforce® platform) may detect its own event trigger occurring within the digital sales platform. The digital sales platform may then perform the platform action internally—by requesting data (e.g., survey response data) from a survey management platform, such as a Qualtrics® platform. In this manner, digital action sequences can be embedded into third-party applications for single-workflow implementation as opposed to connecting two separate workflows (one externally and one internally).

Figure 5:
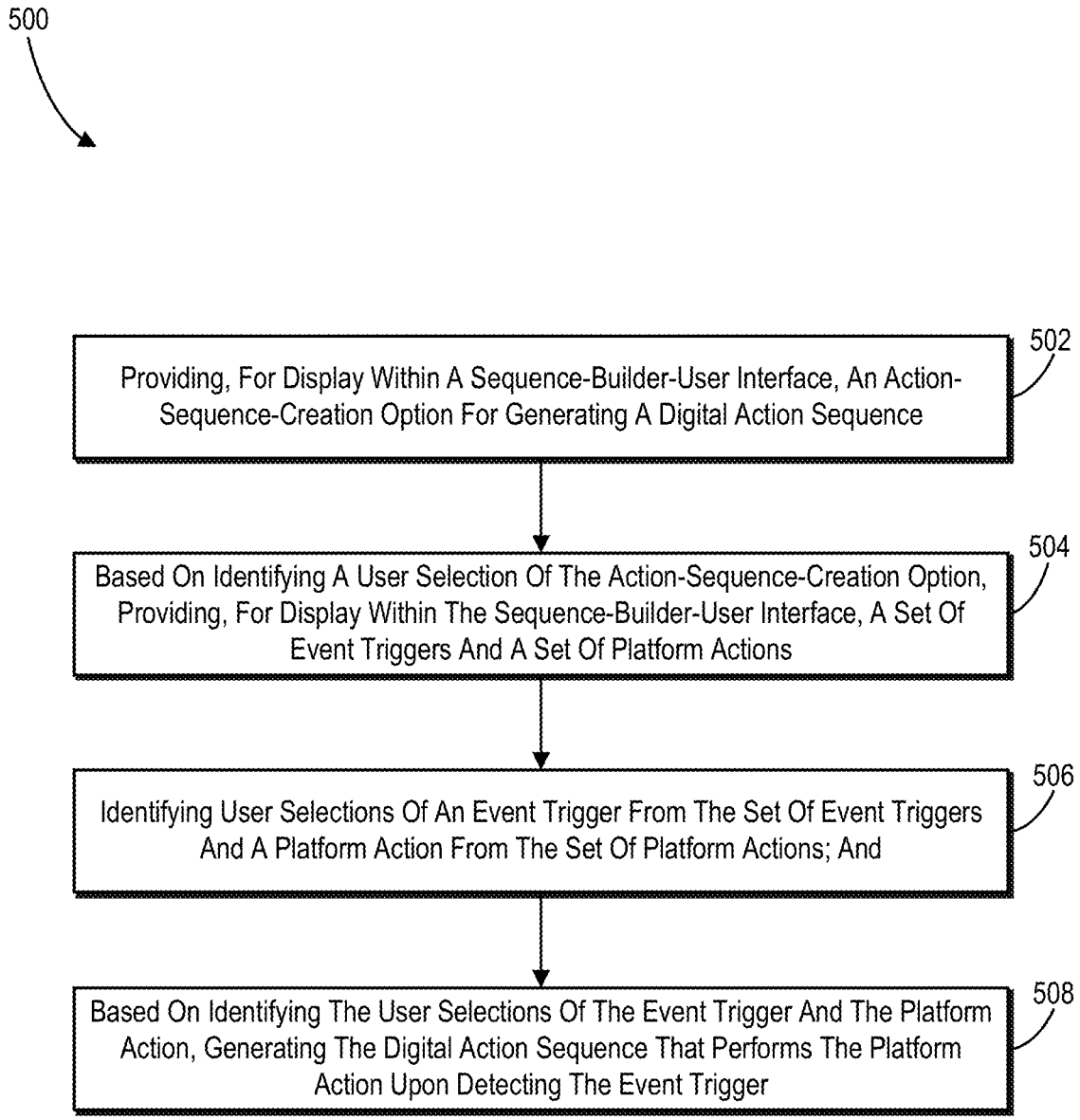
FIG. 5 illustrates a flowchart of a series of acts for generating a digital action sequence based on selections from a client device via a sequence-builder-user interface in accordance with one or more embodiments.

FIGS. 1-4, the corresponding text, and the examples provide several different systems, methods, techniques, components, and/or devices of the action sequence system 105 in accordance with one or more embodiments. In addition to the above description, one or more embodiments can also be described in terms of flowcharts including acts for accomplishing a particular result. For example, FIG. 5 illustrates a flowchart of a series of acts 500 for generating a digital action sequence in accordance with one or more embodiments. The action sequence system 105 may perform one or more acts of the series of acts 500 in addition to or alternatively to one or more acts described in conjunction with other figures. While FIG. 5 illustrates acts according to one embodiment, alternative embodiments may omit, add to, reorder, and/or modify any of the acts shown in FIG. 5. The acts of FIG. 5 can be performed as part of a method. Alternatively, a non-transitory computer-readable medium can comprise instructions that, when executed by one or more processors, cause a computing device to perform the acts of FIG. 5. In some embodiments, a system can perform the acts of FIG. 5.

As shown, the series of acts 500 includes an act 502 of providing, for display within a sequence-builder-user interface, an action-sequence-creation option for generating a digital action sequence.

In addition, the series of acts 500 comprises an act 504 of based on identifying a user selection of the action-sequence-creation option, providing, for display within the sequence-builder-user interface, a set of event triggers and a set of platform actions.

Further, the series of acts 500 includes an act 506 of identifying user selections of an event trigger from the set of event triggers and a platform action from the set of platform actions.

In addition, the series of acts 500 further includes an act 508 of based on identifying the user selections of the event trigger and the platform action, generating the digital action sequence that performs the platform action upon detecting the event trigger.

It is understood that the outlined acts in the series of acts 500 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 5, act(s) in the series of acts 500 may include an act of providing, for display within the sequence-builder-user interface, the set of event triggers and the set of platform actions by: providing the set of event triggers for display within a presentation of the sequence-builder-user interface; and providing the set of platform actions for display within an updated presentation of the sequence-builder-user interface.

As another example of an additional act not shown in FIG. 5, act(s) in the series of acts 500 may include an act of: identifying an additional user selection of a condition for performing the platform action as part of the digital action sequence; and based on detecting the event trigger and one or more parameters satisfying the condition, performing the platform action. In some embodiments, identifying the additional user selection of the condition comprises identifying a Boolean-detection rule for at least one of a question-type parameter, an embedded-data-type parameter, a quota-type parameter, or a status-type parameter.

Additionally, act(s) in the series of acts 500 may include an act of, based on identifying the question-type parameter: providing, for display within the sequence-builder-user interface, a selectable-draft-query option that, in response to user interaction, causes the system to instantiate a query interface for drafting a custom query for the question-type parameter; and providing, for display within the sequencebuilder-user interface, a selectable-draft-response option that, in response to user interaction, causes the system to instantiate a response interface for drafting one or more responses to the custom query.

In yet another example of an additional act not shown in FIG. 5, act(s) in the series of acts 500 may include an act of: identifying user selections of both the platform action and an additional platform action; and based on detecting the event trigger, performing the platform action and the additional platform action.

As an additional example of an act not shown in FIG. 5, act(s) in the series of acts 500 may include an act of: receiving, via the sequence-builder-user interface, user input associating data from the platform action with the additional platform action; and based on performing the platform action, performing the additional platform action using the associated data.

As another example of an additional act not shown in FIG. 5, act(s) in the series of acts 500 may include an act of detecting the event trigger by detecting a digital survey response; an activation, closing, or digital publishing of a digital survey; a digital ticket event; a Java Script Object Notation (JSON) web event; an experience-management event; a creation of a digital content item; a digital event from an external platform; or a user opt-out selection.

As a further example of an additional act not shown in FIG. 5, act(s) in the series of acts 500 may include an act of performing the platform action by transmitting an electronic communication, generating a digital ticket, updating digital survey distribution data, adding data identifying or describing the event trigger to an experience-management log for an organization, adding or inserting code into a software application, or transmitting digital integration data to a third-party server via an application programming interface.

In yet another example of an additional act not shown in FIG. 5, act(s) in the series of acts 500 may include an act of providing, for display within the sequence-builder-user interface, the set of event triggers and the set of platform actions by providing, for display within the sequence-builder-user interface: a suggested digital-action-sequence template comprising the digital action sequence for performing the platform action upon detecting the event trigger; and an additional suggested digital-action-sequence template comprising an additional digital action sequence for performing an additional platform action upon detecting an additional event trigger.

As an additional example of an act not shown in FIG. 5, act(s) in the series of acts 500 may include an act of determining, utilizing a machine-learning model, the suggested digital-action-sequence template based on one or more template parameters comprising one or more of a user-account-type identifier, a department-type identifier, digital user activity, metadata corresponding to the event trigger or the platform action, a feature or service of a digital orchestration platform selected by a user account within a threshold time period, or a type of a digital survey selected or distributed by the user account.

As another example of an additional act not shown in FIG. 5, act(s) in the series of acts 500 may include an act of: receiving, via the sequence-builder-user interface, user input associating data from the platform action with a user profile; and after performing the platform action, performing an additional platform action using the associated data from the user profile.

As a further example of an additional act not shown in FIG. 5, act(s) in the series of acts 500 may include an act of: identifying an additional user selection of an additional event trigger as part of the digital action sequence; and performing the platform action upon detecting the event trigger and the additional event trigger.

In yet another example of an additional act not shown in FIG. 5, act(s) in the series of acts 500 may include an act of: providing the set of event triggers for display within a presentation of the sequence-builder-user interface; providing one or more selectable conditions for performing platform actions within an updated presentation of the sequence-builder-user interface; and providing the set of platform actions for display within an additional updated presentation of the sequence-builder-user interface.

Still further, in another example of an additional act not shown in FIG. 5, act(s) in the series of acts 500 may include an act of providing, for display within the sequence-builder-user interface, the event trigger from the set of event triggers and the platform action from the set of platform actions by: identifying one or more template parameters; and based on the one or more template parameters, providing, for display within the sequence-builder-user interface, a suggested digital-action-sequence template comprising the digital action sequence for performing the platform action upon detecting the event trigger.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 6:
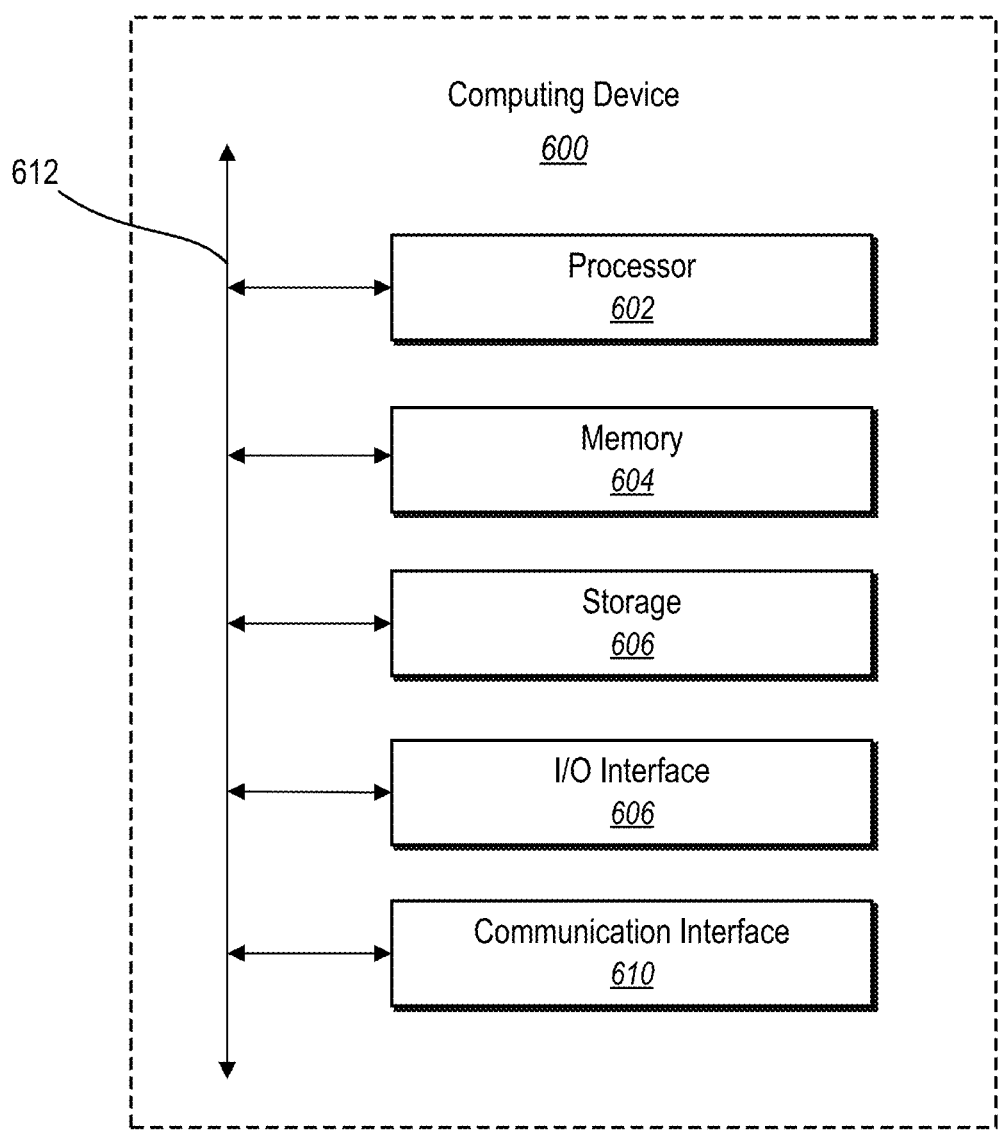
FIG. 6 illustrates a block diagram of an example computing device for implementing one or more embodiments of the present disclosure.

FIG. 6 illustrates a block diagram of an example computing device 600 that may be configured to perform one or more of the processes described above. One will appreciate that one or more computing devices, such as the computing device 600 may represent the computing devices described above (e.g., the server(s) 102, the administrator client device 106, the client devices 107a-107n, the third-party server(s) 110, the administrator client device 202, and/or the computing device 300). In one or more embodiments, the computing device 600 may be a mobile device (e.g., a mobile telephone, a smartphone, a PDA, a tablet, a laptop, a camera, a tracker, a watch, a wearable device, etc.). In some embodiments, the computing device 600 may be a non-mobile device (e.g., a desktop computer or another type of client device). Further, the computing device 600 may be a server device that includes cloud-based processing and storage capabilities.

As shown in FIG. 6, the computing device 600 can include one or more processor(s) 602, memory 604, a storage device 606, input/output interfaces 608 (or "I/O interfaces 608"), and a communication interface 610, which may be communicatively coupled by way of a communication infrastructure (e.g., bus 612). While the computing device 600 is shown in FIG. 6, the components illustrated in FIG. 6 are not intended to be limiting. Additional or alternative components may be used in other embodiments. Furthermore, in certain embodiments, the computing device 600 includes fewer components than those shown in FIG. 6. Components of the computing device 600 shown in FIG. 6 will now be described in additional detail.

In particular embodiments, the processor(s) 602 includes hardware for executing instructions, such as those making up a computer program. As an example, and not by way of limitation, to execute instructions, the processor(s) 602 may retrieve (or fetch) the instructions from an internal register, an internal cache, memory 604, or a storage device 606 and decode and execute them.

The computing device 600 includes memory 604, which is coupled to the processor(s) 602. The memory 604 may be used for storing data, metadata, and programs for execution by the processor(s). The memory 604 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 604 may be internal or distributed memory.

The computing device 600 includes a storage device 606 includes storage for storing data or instructions. As an example, and not by way of limitation, the storage device 606 can include a non-transitory storage medium described above. The storage device 606 may include a hard disk drive (HDD), flash memory, a Universal Serial Bus (USB) drive or a combination these or other storage devices.

As shown, the computing device 600 includes one or more I/O interfaces 608, which are provided to allow a user to provide input to (such as user strokes), receive output from, and otherwise transfer data to and from the computing device 600. These I/O interfaces 608 may include a mouse, keypad or a keyboard, a touch screen, camera, optical scanner, network interface, modem, other known I/O devices or a combination of such I/O interfaces 608. The touch screen may be activated with a stylus or a finger.

The I/O interfaces 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 608 are configured to provide graphical data to a display for presentation to a user. The graphical data may be representative of one or more graphical user interfaces and/or any other graphical content as may serve a particular implementation.

The computing device 600 can further include a communication interface 610. The communication interface 610 can include hardware, software, or both. The communication interface 610 provides one or more interfaces for communication (such as, for example, packet-based communication) between the computing device and one or more other computing devices or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI. The computing device 600 can further include a bus 612. The bus 612 can include hardware, software, or both that connects components of the computing device 600 to each other.

Figure 7:
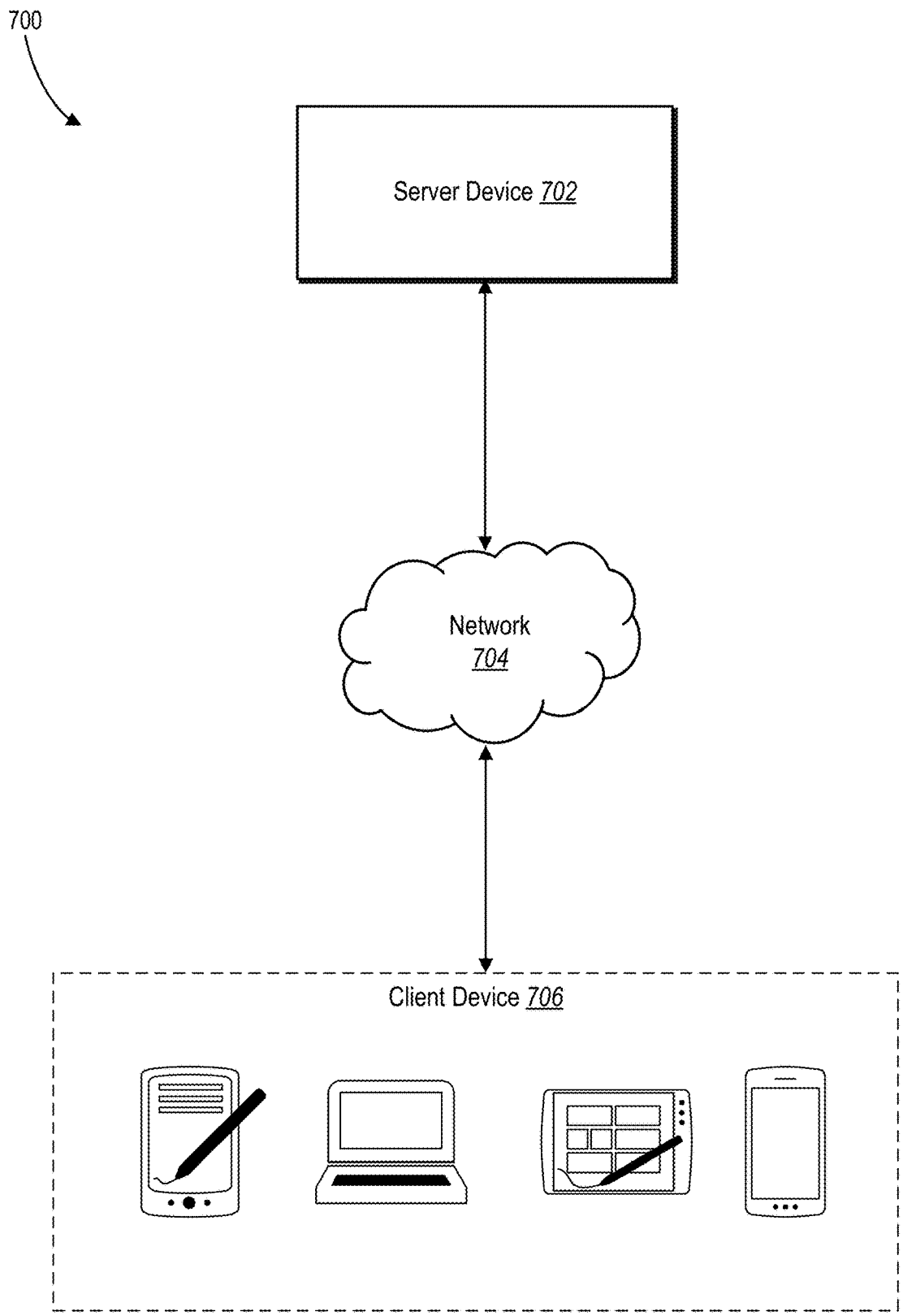
FIG. 7 illustrates a network environment of an action sequence system in accordance with one or more embodiments.

FIG. 7 illustrates an example network environment 700 of the action sequence system 105. Network environment 700 includes a server device 702 and client device 706 connected to each other by a network 704. Although FIG. 7 illustrates a particular arrangement of client device 706, server device 702, and network 704, this disclosure contemplates any suitable arrangement of client device 706, server device 702, and network 704. As an example and not by way of limitation, two or more of the client devices 706 and server device 702 may be connected to each other directly, bypassing network 704. As another example, two or more of client devices 706 and server device 702 may be physically or logically co-located with each other in whole, or in part. Moreover, although FIG. 7 illustrates a particular number of client devices 706, server device 702, and networks 704, this disclosure contemplates any suitable number of client devices 706, server device 702, and networks 704. As an example and not by way of limitation, network environment 700 may include multiple client devices 706, multiple server devices 702, and networks 704.

This disclosure contemplates any suitable network 704. As an example and not by way of limitation, one or more portions of network 704 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 704 may include one or more networks 704.

Links may connect client device 706 and server device 702 to network 704 or to each other. This disclosure contemplates any suitable links. In particular embodiments, one or more links include one or more wireline (such as for example Digital Subscriber Line ("DSL") or Data Over Cable Service Interface Specification ("DOC SIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client device 706 may be an electronic device including hardware, software, or embedded logic components or a combination of two or more such components and capable of carrying out the appropriate functionalities implemented or supported by client device 706. As an example and not by way of limitation, a client device 706 may include any of the computing devices discussed above in relation to FIG. 6. A client device 706 may enable a network user at client device 706 to access network 704.

In particular embodiments, client device 706 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 706 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 706 one or more Hyper Text Markup Language ("HTML") files responsive to the HTTP request. Client device 706 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 702 may include a variety of servers, sub-systems, programs, modules, logs, and data stores. In particular embodiments, server device 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 702 may also include suitable components such as network interfaces, security mechanisms, load balancers, failover servers, management-and-network-operations consoles, other suitable components, or any suitable combination thereof.

In particular embodiments, server device 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., respondents, customers).

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to:
provide, for display within a sequence-builder-user interface of a client device, an action-sequence-creation option for generating a digital action sequence;
based on identifying a user selection of the action-sequence-creation option from the client device, provide data to cause the client device to present, within the sequence-builder-user interface:
a display of a set of event triggers;
a display of a set of platform actions; and
a display of at least one suggested digital action sequence template comprising, within the sequence-builder-user interface, a pre-configured combination of an event trigger and at least a platform action;
identify one or more user selections of an event trigger from the set of event triggers or from the at least one suggested digital action sequence template and a platform action from the set of platform actions or from the at least one suggested digital action sequence template; and
based on identifying the one or more user selections of the event trigger and the platform action, generate the digital action sequence that performs the platform action upon detecting the event trigger.

2. The non-transitory computer-readable medium of claim 1, further comprising instructions that, when executed by the at least one processor, cause the computing device to provide, for display within the sequence-builder-user interface, the set of event triggers and the set of platform actions by:
providing the set of event triggers for display within a presentation of the sequence-builder-user interface;
receiving an indication of a user selection of the event trigger from the set of event triggers; and
based on receiving the indication of the user selection of the event trigger, providing the set of platform actions for display within an updated presentation of the sequence-builder-user interface.

3. The non-transitory computer-readable medium of claim 1, further comprising instructions that, when executed by the at least one processor, cause the computing device to:
identify an additional user selection of a condition for performing the platform action as part of the digital action sequence; and
based on detecting the event trigger and one or more parameters satisfying the condition, perform the platform action.

4. The non-transitory computer-readable medium of claim 1, further comprising instructions that, when executed by the at least one processor, cause the computing device to:
identify user selections of both the platform action or the at least one suggested digital action sequence template and an additional platform action; and
based on detecting the event trigger, perform the platform action and the additional platform action.

5. The non-transitory computer-readable medium of claim 4, further comprising instructions that, when executed by the at least one processor, cause the computing device to:
receive, via the sequence-builder-user interface, user input associating data from the platform action or the at least one suggested digital action sequence template with the additional platform action; and
based on performing the platform action, perform the additional platform action using the associated data.

6. The non-transitory computer-readable medium of claim 1, further comprising instructions that, when executed by the at least one processor, cause the computing device to detect the event trigger by detecting a digital survey response; an activation, closing, or digital publishing of a digital survey; a digital ticket event; a Java Script Object Notation (JSON) web event; an experience-management event; a creation of a digital content item; a digital event from an external platform; or a user opt-out selection.

7. The non-transitory computer-readable medium of claim 1, further comprising instructions that, when executed by the at least one processor, cause the computing device to perform the platform action by transmitting an electronic communication, generating a digital ticket, updating digital survey distribution data, adding data identifying or describing the event trigger to an experience-management log for an organization, adding or inserting code into a software application, or transmitting digital integration data to a third-party server via an application programming interface.

8. The non-transitory computer-readable medium of claim 1, further comprising instructions that, when executed by the at least one processor, cause the computing device to provide, for display within the sequence-builder-user interface of the client device, an additional suggested digital-action-sequence template comprising, within the sequence-builder-user interface, a pre-configured combination of an additional event trigger and an additional platform action for performing an additional digital action sequence.

9. The non-transitory computer-readable medium of claim 1, further comprising instructions that, when executed by the at least one processor, cause the computing device to determine, utilizing a machine-learning model, the at least one suggested digital-action-sequence template based on one or more template parameters comprising one or more of a user-account-type identifier, a department-type identifier, digital user activity, metadata corresponding to the event trigger or the platform action, a feature or service of a digital orchestration platform selected by a user account within a threshold time period, or a type of a digital survey selected or distributed by the user account.

10. A system comprising:
at least one processor; and
at least one non-transitory computer-readable storage medium comprising instructions that, when executed by the at least one processor, cause the system to:
provide, for display within a sequence-builder-user interface of a client device, an action-sequence-creation option for generating a digital action sequence;
based on identifying a user selection of the action-sequence-creation option from the client device, provide data to cause the client device to present, within the sequence-builder-user interface:
a display of a set of event triggers;
a display of a set of platform actions; and
a display of at least one suggested digital action sequence template comprising within the sequence-builder-user interface, a pre-configured combination of an event trigger and at least a platform action;
identify one or more user selections of an event trigger from the set of event triggers or from the at least one suggested digital action sequence template and a platform action from the set of platform actions or from the at least one suggested digital action sequence template; and
based on identifying the one or more user selections of the event trigger and the platform action, generate the digital action sequence that performs the platform action upon detecting the event trigger.

11. The system of claim 10, further comprising instructions that, when executed by the at least one processor, cause the system to provide, for display within the sequence-builder-user interface, the set of event triggers and the set of platform actions by:
providing the set of event triggers for display within a presentation of the sequence-builder-user interface;
receiving an indication of a user selection of the event trigger from the set of event triggers; and
based on receiving an indication of a user selection of the event trigger, providing the set of platform actions for display within an updated presentation of the sequence-builder-user interface.

12. The system of claim 10, further comprising instructions that, when executed by the at least one processor, cause the system to:
identify an additional user selection of a condition for performing the platform action as part of the digital action sequence; and
based on detecting the event trigger and one or more parameters satisfy the condition, perform the platform action.

13. The system of claim 12, further comprising instructions that, when executed by the at least one processor, cause the system to identify the additional user selection of the condition by identifying a Boolean-detection rule for at least one of a question-type parameter, an embedded-data-type parameter, a quota-type parameter, or a status-type parameter.

14. The system of claim 13, further comprising instructions that, when executed by the at least one processor, cause the system to, based on identifying the question-type parameter:
provide, for display within the sequence-builder-user interface, a selectable-draft-query option that, in response to user interaction, causes the system to instantiate a query interface for drafting a custom query for the question-type parameter; and
provide, for display within the sequence-builder-user interface, a selectable-draft-response option that, in response to user interaction, causes the system to instantiate a response interface for drafting one or more responses to the custom query.

15. The system of claim 10, further comprising instructions that, when executed by the at least one processor, cause the system to:
receive, via the sequence-builder-user interface, user input associating data from the platform action or the at least one suggested digital action sequence template with a user profile; and
after performing the platform action, perform an additional platform action using the associated data from the user profile.

16. A computer-implemented method comprising:
providing, for display within a sequence-builder-user interface of a client device, an action-sequence-creation option for generating a digital action sequence;
based on identifying a user selection of the action-sequence-creation option from the client device, providing data to cause the client device to present, within the sequence-builder-user interface:
a display of a set of event triggers;
a display of a set of platform actions; and
a display of at least one suggested digital action sequence template comprising, within the sequence-builder-user interface, a pre-configured combination of an event trigger and at least a platform action;
identifying one or more user selections of an event trigger from the set of event triggers or from the at least one suggested digital action sequence template and a platform action from the set of platform actions or from the at least one suggested digital action sequence template; and
based on identifying the one or more user selections of the event trigger and the platform action, generating the digital action sequence that performs the platform action upon detecting the event trigger.

17. The computer-implemented method of claim 16, further comprising performing the platform action in response to detecting the event trigger.

18. The computer-implemented method of claim 16, further comprising:
identifying an additional user selection of an additional event trigger as part of the digital action sequence; and
performing the platform action upon detecting the event trigger and the additional event trigger.

19. The computer-implemented method of claim 16, further comprising:
providing the set of event triggers for display within a presentation of the sequence-builder-user interface;
providing one or more selectable conditions for performing platform actions within an updated presentation of the sequence-builder-user interface; and providing the set of platform actions for display within an additional updated presentation of the sequence-builder-user interface.

20. The computer-implemented method of claim 16, further comprising providing, for display within the sequence-builder-user interface, the at least one suggested digital action sequence template by:
   identifying one or more template parameters; and
   generating, based on the one or more template parameters, the at least one suggested digital-action-sequence template.

* * * * *